US011321872B2

(12) United States Patent
Lipchin et al.

(10) Patent No.: US 11,321,872 B2
(45) Date of Patent: May 3, 2022

(54) METHOD FOR CALIBRATING A CAMERA USING BOUNDING BOXES, AND CAMERA CONFIGURED TO PERFORM THAT METHOD

(71) Applicant: Avigilon Corporation, Vancouver (CA)

(72) Inventors: Aleksey Lipchin, Newton, MA (US); Sergey Veselkov, Ashland, MA (US)

(73) Assignee: AVIGILON CORPORATION, Vancouver (CA)

(*) Notice: Subject to any disclaimer, the term of this patent is extended or adjusted under 35 U.S.C. 154(b) by 205 days.

(21) Appl. No.: 16/879,021

(22) Filed: May 20, 2020

(65) Prior Publication Data
US 2021/0019914 A1 Jan. 21, 2021

Related U.S. Application Data

(60) Provisional application No. 62/876,470, filed on Jul. 19, 2019.

(51) Int. Cl.
| | |
|---|---|
| G06T 7/80 | (2017.01) |
| H04N 5/225 | (2006.01) |
| G06V 10/22 | (2022.01) |
| G06V 10/42 | (2022.01) |
| G06V 40/10 | (2022.01) |

(52) U.S. Cl.
CPC ............ *G06T 7/80* (2017.01); *G06V 10/22* (2022.01); *G06V 10/42* (2022.01); *G06V 40/103* (2022.01); *H04N 5/2254* (2013.01)

(58) Field of Classification Search
CPC ........................................................ G06T 7/80

USPC ............................................................ 348/241
See application file for complete search history.

(56) References Cited

U.S. PATENT DOCUMENTS

2010/0295948 A1* 11/2010 Xie .......................... G06T 7/80
348/E17.002

FOREIGN PATENT DOCUMENTS

KR  10-1469099  9/2014

OTHER PUBLICATIONS

A. Criminisi, I. Reid, and A. Zisserman, "Single view metrology," International Journal of Computer Vision, vol. 40, No. 2, Nov. 2000; pp. 123-148.

(Continued)

*Primary Examiner* — Joel W Fosselman
(74) *Attorney, Agent, or Firm* — Perry + Currier, Inc.

(57) ABSTRACT

Methods, systems, and techniques for automatic camera calibration. One or more calibration images are captured using a camera. The calibration images depict one or more bounding boxes, and each of the bounding boxes bounds a person. For each of the bounding boxes, the person is modeled using a rectangle or a parallelepiped, and a projection of the rectangle or parallelepiped is determined. A mapping that maps foot vertices of the projection to head vertices of the projection is determined, and using the foot vertices and the mapping, estimates of the head vertices and distances between the head vertices and the estimates of the head vertices are determined. The camera is calibrated by iteratively updating, using an objective function, the camera parameters so as to reduce those distances.

31 Claims, 26 Drawing Sheets

(56) References Cited

OTHER PUBLICATIONS

Bouguet, J. Y. "Camera Calibration Toolbox for Matlab.," Computational Vision at the California Institute of Technology, archived Jun. 23, 2019, retrieved from the Internet at https://web.archive.org/web/20190623040113/http://www.vision.caltech.edu/bouguetj/calib_doc/, 5 pages.

S. C. Lee and R. Nevatia, "Robust camera calibration tool for video surveillance camera in urban environment," in Computer Vision and Pattern Recognition (CVPR) 2011 Workshops, IEEE Computer Society Conference on Jun. 2011, pp. 62-67.

N. Krahnstoever and P. R. Mendonca, "Bayesian autocalibration for surveillance," in Tenth IEEE International Conference on Computer Vision, ICCV 2005, vol. 2, pp. 1858-1865.

F. Lv, T. Zhao, and R. Nevatia, "Camera calibration from video of a walking human," IEEE transactions on pattern analysis and machine intelligence, vol. 28, No. 9, Sep. 2006, pp. 1513-1518.

B. Micusik and T. Pajdla, "Simultaneous surveillance camera calibration and foot-head homology estimation from human detections," Proceedings/CVPR, IEEE Computer Society Conference on Computer Vision and Pattern Recognition, Jun. 2010, pp. 1562-1569.

J. Jung, I. Yoon, S. Lee, and J. Paik, "Object Detection and Tracking-Based Camera Calibration for Normalized Human Height Estimation," Journal of Sensors, vol. 2016, 2016, pp. 1-9.

G. Fuhr and C. R. Jung, "Camera Self-Calibration Based on Nonlinear Optimization and Applications in Surveillance Systems," IEEE Transactions on Circuits and Systems for Video Technology, vol. 27, No. 5, Dec. 23, 2015, pp. 1132-1142.

Z. Zhang, M. Li, K. Huang, and T. Tan, "Practical camera autocalibration based on object appearance and motion for traffic scene visual surveillance," 2008 IEEE Conference on Computer Vision and Pattern Recognition, Anchorage, AK, 2008, pp. 1-8.

Y. Zheng, Z. He, W.-G. Yang, and X. F. Zhang, "An efficient and practical calibration method for roadside camera using two vanishing points," Proceedings 2014 IEEE International Conference on Security, Pattern Analysis, and Cybernetics (SPAC), Jan. 2014, pp. 65-69.

Y. Zheng and Silong Peng, "A Practical Roadside Camera Calibration Method Based on Least Squares Optimization," IEEE Transactions on Intelligent Transportation Systems, vol. 15, No. 2, Apr. 2014, pp. 831-843.

J. Lezama, R. Grompone von Gioi, G. Randall, and J.-M. Morel, "Finding vanishing points via point alignments in image primal and dual domains," in Proceedings of the IEEE Conference on Computer Vision and Pattern Recognition, 2014, pp. 509-515.

B. Li, K. Peng, X. Ying, and H. Zha, "Simultaneous vanishing point detection and camera calibration from single images," in Advances in Visual Computing, Springer, 2010, pp. 151-160.

E. Guillou, D. Meneveaux, E. Maisel, and K. Bouatouch, "Using vanishing points for camera calibration and coarse 3D reconstruction from a single image," The Visual Computer, vol. 16, No. 7, Nov. 2000, pp. 396-410.

Wikipedia article, "Random Sample Consensus," archived Jul. 9, 2019, retrieved from the Internet at https://en.wikipedia.org/w/index.php?title=Random_sample_consensus&oldid=905546191, 10 pages.

Jingchen Liu, Robert T. Collins, Yanxi Liu, "Surveillance Camera Autocalibration based on Pedestrian Height Distributions", British Machine Vision Conference 2011, Jan. 2011, pp. 1-11.

"MobileNet-SSD," archived May 23, 2019, retrieved from the Internet at https://web.archive.org/web/20190523100644/https://github.com/chuanqi305/MobileNet-SSD, 6 pages.

Unreal Engine, archived Jul. 18, 2019, retrieved from the Internet at https://web.archive.org/web/20190718182328/https://www.unrealengine.com/en-US/, 15 pages.

\* cited by examiner

NR. $c < 0, x_c > v_x$  PL. $c > 0, v_x > x_c$

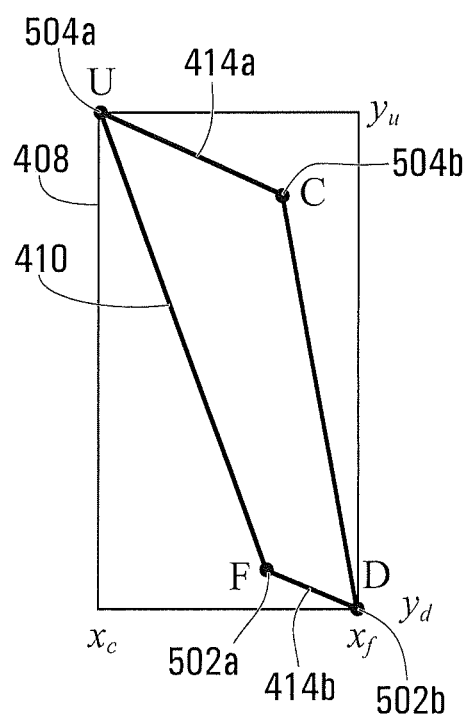
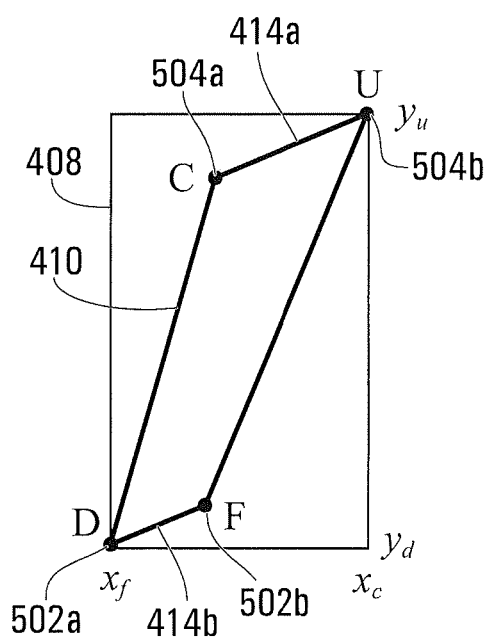
NL. $c < 0, x_c < v_x$
PR. $c > 0, v_x < x_c$
FIG. 9A
FIG. 9B

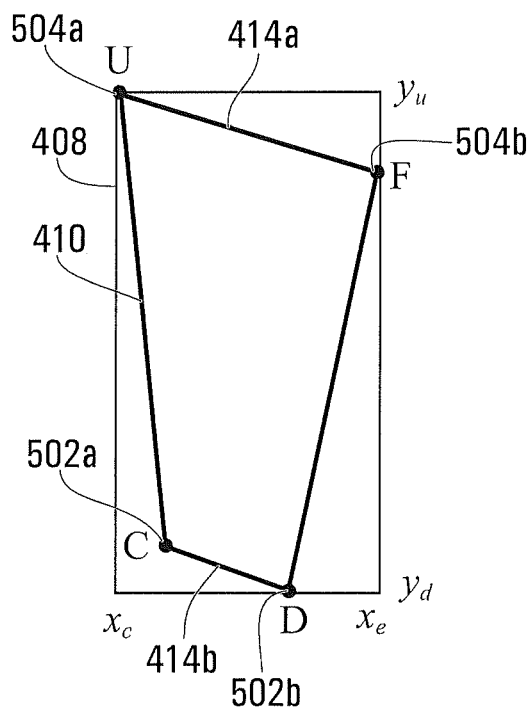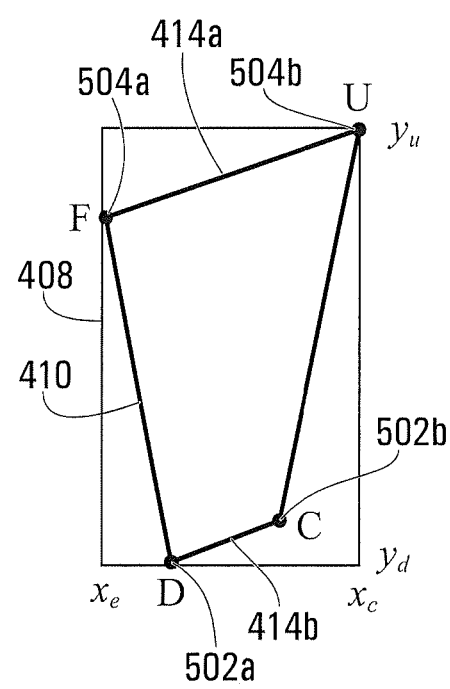
NM. $c<0$, $x_c \leq v_x \leq x_e$
PM. $c \geq 0$, $x_e \leq v_x \leq x_c$
FIG. 10A
FIG. 10B

METHOD FOR CALIBRATING A CAMERA USING BOUNDING BOXES, AND CAMERA CONFIGURED TO PERFORM THAT METHOD

CROSS-REFERENCE TO RELATED APPLICATIONS

The present application claims the benefit of provisional application No. 62/876,470 filed on Jul. 19, 2019, the entire contents of which are hereby incorporated by reference.

TECHNICAL FIELD

The present subject-matter relates to video surveillance, and more particularly to a method for calibrating a camera using bounding boxes, and to a camera that has been configured to perform that method.

BACKGROUND

Automated security and surveillance systems typically employ video cameras or other image capturing devices or sensors to collect image data such as video or video footage. Images represented by the image data may be displayed for contemporaneous screening by security personnel and/or recorded for later review after a security breach.

Computer implemented visual object classification, also called object recognition, pertains to the classifying of visual representations of real-life objects found in still images or motion videos captured by a camera. By performing visual object classification, each visual object found in the still images or motion video is classified according to its type (such as, for example, person, vehicle, or animal).

SUMMARY

According to a first aspect, there is provided a method comprising: obtaining one or more calibration images captured using a camera, the one or more calibration images comprising one or more bounding boxes of which each bounds a person; for each of the bounding boxes, determining: from tilt, roll, and focal length of the camera, a vanishing point and a horizon line of the calibration image; using the vanishing point and the horizon line, a projection of the person bounded by the bounding box; using the vanishing point, the horizon line, a height of the camera, and a presumed height of the person, a mapping that maps foot vertices of the projection to head vertices of the projection; and using at least one of the foot vertices and the mapping, at least one estimate of the head vertices and at least one distance between at least one of the head vertices and the at least one estimate; and calibrating the camera by iteratively updating, using an objective function and the at least one of the distances for each of the one or more bounding boxes, at least one of the tilt, roll, focal length, and height of the camera The projection may be a trapezoid that is projected from a rectangle that bounds the person.

A height of the rectangle may be the presumed height of the person.

Using a Cartesian coordinate system, the camera may be located at X=Y=0 and the rectangle may be parallel to coordinate plane (X,Z).

Top and bottom sides of the trapezoid may be parallel to the horizon line.

The method may further comprise, after the camera has been calibrated: obtaining a sample image captured using the camera, wherein the sample image comprises a sample bounding box that bounds an object; determining an estimated height of the object using a bottom of the sample bounding box and the mapping; comparing the estimated height to the presumed height; and when the estimated height and the presumed height differ by less than a minimum person height, flagging the object as a person.

For at least one of the calibration images, the focal length may be known prior to calibration and is excluded from the updating.

For at least one of the calibration images, the tilt and roll may be known prior to calibration and are excluded from the updating.

For at least one of the calibration images, the vertices of the projection may be on the bounding box.

For at least one of the calibration images, the horizon line may have a negative slope.

For at least one of the calibration images, the horizon line may have a positive slope.

For at least one of the calibration images for which the horizon line has a negative slope, a horizontal position of the vanishing point may be less than a horizontal position of a leftmost one of the foot vertices.

For at least one of the calibration images for which the horizon line has a negative slope, a horizontal position of the vanishing point may be greater than a horizontal position of a leftmost one of the head vertices.

For at least one of the calibration images for which the horizon line has a negative slope, a horizontal position of the vanishing point may equal or exceed a horizontal position of a leftmost one of the head vertices, and be less than or equals a horizontal position of a rightmost one of the head vertices.

For at least one of the calibration images for which the horizon line has a positive slope, a horizontal position of the vanishing point may be greater than a horizontal position of a rightmost one of the foot vertices.

For at least one of the calibration images for which the horizon line has a positive slope, a horizontal position of the vanishing point may be less than a horizontal position of a rightmost one of the head vertices.

For at least one of the calibration images for which the horizon line has a positive slope, a horizontal position of the vanishing point may equal or exceed a horizontal position of a leftmost one of the head vertices, and be less than or equals a horizontal position of a rightmost one of the head vertices.

For at least one of the calibration images, the tilt may be deemed to be 180 degrees, and the result of the updating the at least one of the calibration images for which the tilt is deemed to be 180 degrees may be used as a starting point for the updating of at least one other of the calibration images for which the tilt is non-horizontal.

The mapping may comprise a feet-to-head homology.

The feet-to-head homology may be determined as $$H_{fh} = I - \frac{h_H}{h_C} \frac{\tilde{v}\tilde{l}^T}{\tilde{v}^T \tilde{l}},$$

wherein I is a 3×3 identity matrix, $h_H$ is the presumed height of the person, $h_C$ is the height of the camera, $\tilde{v}_T \tilde{l}$ is a vector dot product of a transpose of the vanishing point in homogenous coordinates and the horizon line in homogenous coordinates, and $\tilde{v}\tilde{l}^T$ is a vector outer product of the vanishing point in homogenous coordinates and a transpose of the horizon line in homogenous coordinates.

The projection may be of a parallelepiped that bounds the person.

A height of the parallelepiped may be the presumed height of the person.

Using a Cartesian coordinate system, the camera may be located at X=Y=0 and the parallelepiped may have faces parallel to coordinate planes (X,Z), (X,Y), and (Y,Z).

Edges of the projection of the parallelepiped corresponding to horizontal edges of the parallelepiped may be parallel to the horizon line.

The parallelepiped may be square in a ground plane on which the person stands.

Determining the projection may be performed using, in addition to the vanishing point and the horizon line, an image-to-ground homography.

The image-to-ground homography may be determined as $$H_{iq} = \begin{pmatrix} f\cos\rho & -f\sin\rho\cos\theta & -f\frac{h_C}{h_H}\sin\rho\sin\theta \\ f\sin\rho & f\cos\rho\cos\theta & f\frac{h_C}{h_H}\cos\rho\sin\theta \\ 0 & \sin\theta & -\frac{h_C}{h_H}\cos\rho \end{pmatrix}$$

wherein $h_H$ is the presumed height of the person, $h_C$ is the height of the camera, f is the focal length of the camera, $\theta$ is the tilt of the camera, and $\rho$ is the roll of the camera.

An initial guess for a solution to the objective function may be a solution to a linear regression model of estimated height of the person based on coordinates in the calibration image.

According to another aspect, there is provided a camera comprising: a camera housing comprising an aperture; an image sensor within the housing; a lens positioned within the housing such that light entering the aperture is focused on the image sensor; a processor communicatively coupled to the image sensor; and a memory device having stored thereon computer program code that is executable by the processor and that, when executed by the processor, causes the processor to perform the method of any of the aforementioned aspects or suitable combinations thereof.

According to another aspect, there is provided a security system comprising: a camera; and a server communicatively coupled to the camera, wherein the camera and the server are collectively configured to perform the method of any of the aforementioned aspects or suitable combinations thereof.

According to another aspect, there is provided a memory device having stored thereon computer program code that is executable by a processor and that, when executed by the processor, causes the processor to perform the method of any of the foregoing aspects or suitable combinations thereof.

This summary does not necessarily describe the entire scope of all aspects.

Other aspects, features and advantages will be apparent to those of ordinary skill in the art upon review of the following description of specific embodiments.

BRIEF DESCRIPTION OF THE DRAWINGS

The detailed description refers to the following figures, in which:

FIGS. 8A, 8B, 9A, 9B, 10A, and 10B depict trapezoids corresponding to horizon lines of positive and negative slope and variously positioned relative to a common vanishing point;

Figure 1:
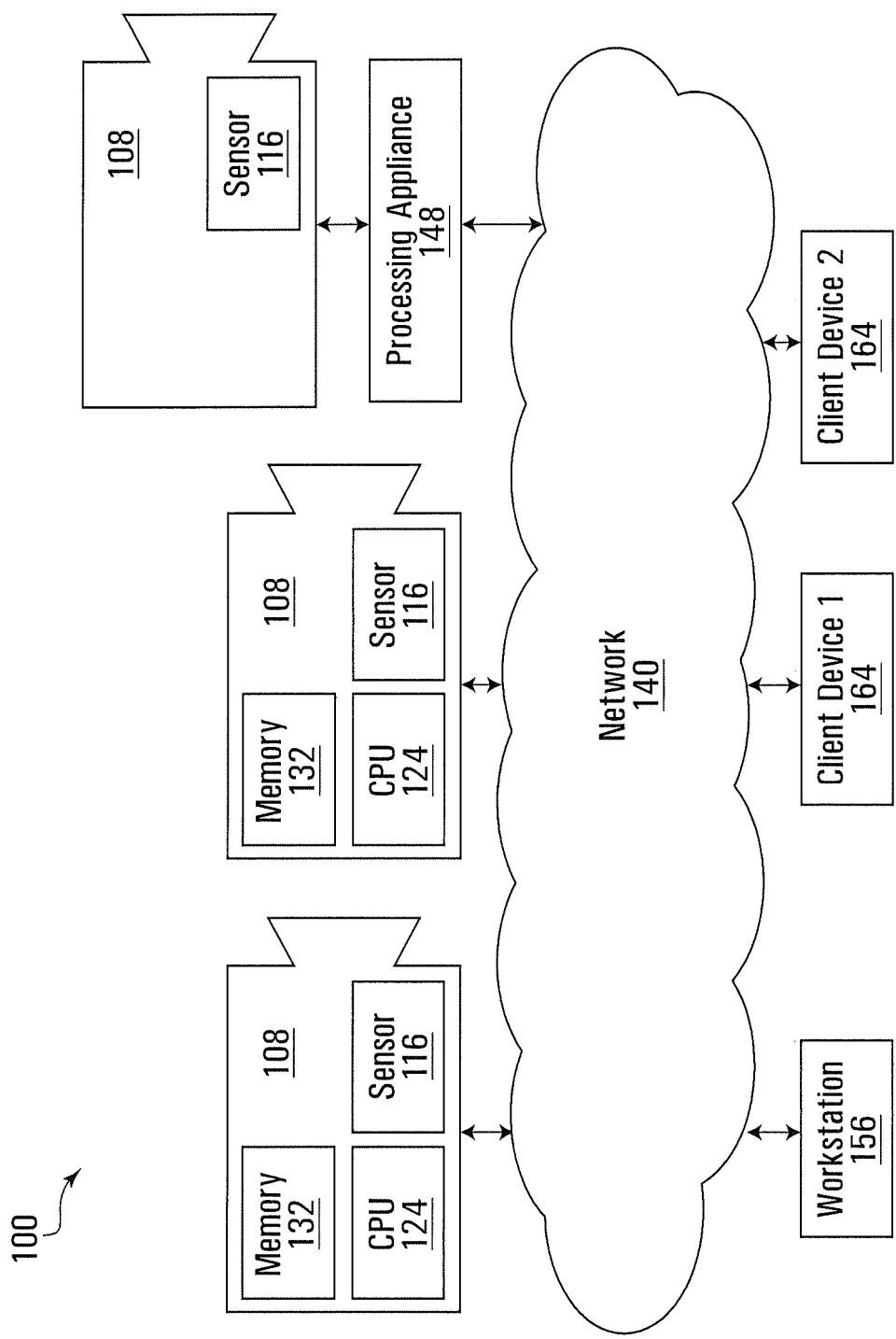
FIG. 1 illustrates a block diagram of connected devices of a video capture and playback system according to an example embodiment.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise. Additionally, as used herein the term "and/or" in the context of a list of items means any one or more of those items (e.g., "A, B, and/or C" means "any one or more of A, B, and C").

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

Herein, an image may include a plurality of sequential image frames, which together form a video captured by the video capture device. Each image frame may be represented by a matrix of pixels, each pixel having a pixel image value. For example, the pixel image value may be a numerical value on grayscale (ex; 0 to 255) or a plurality of numerical values for colored images. Examples of color spaces used to represent pixel image values in image data include RGB, YUV, CYKM, YCBCR 4:2:2, YCBCR 4:2:0 images.

Processing video may include, but is not limited to, image processing operations, analyzing, managing, compressing, encoding, storing, transmitting and/or playing back the video data. Analyzing the video may include segmenting areas of image frames and detecting visual objects, and/or tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames. "Metadata" or variants thereof herein refers to information obtained by computer-implemented analysis of images including images in video.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 being operable to capture a plurality of images and produce image data representing the plurality of captured images. The video capture device 108 or camera 108 is an image capturing device and includes security video cameras.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD. In some embodiments, the video capture device 108 may be an analog camera connected to an encoder.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another video capture device 108. For example, the dedicated camera may be a surveillance camera, such as any one of a pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors and one or more network interfaces. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) embedded processor, a visual processing unit or a vision processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 116 and the network interface may be implemented within a SOC. Furthermore, when implemented in this way, a general purpose processor and one or more of a GPU or VPU, and a DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to a processor (CPU). The processing appliance 148 may also include one or more network interfaces. For convenience of illustration, only one processing appliance 148 is shown; however it will be understood that the video capture and playback system 100 may include any suitable number of processing appliances 148.

For example, and as illustrated, the processing appliance 148 is connected to a video capture device 108 which may not have memory 132 or CPU 124 to process image data. The processing appliance 148 may be further connected to the network 140.

According to one example embodiment, and as illustrated in FIG. 1, the video capture and playback system 100 includes at least one workstation 156 (such as, for example, a server), each having one or more processors including graphics processing units (GPUs). The at least one workstation 156 may also include storage memory. The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (such as, for example, a mouse, keyboard, or touchscreen). The client device 164 is operable to display on its display device a user interface for displaying information, receiving user input, and playing back video. For example, the client device may be any one of a personal computer, laptop, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation 186 and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
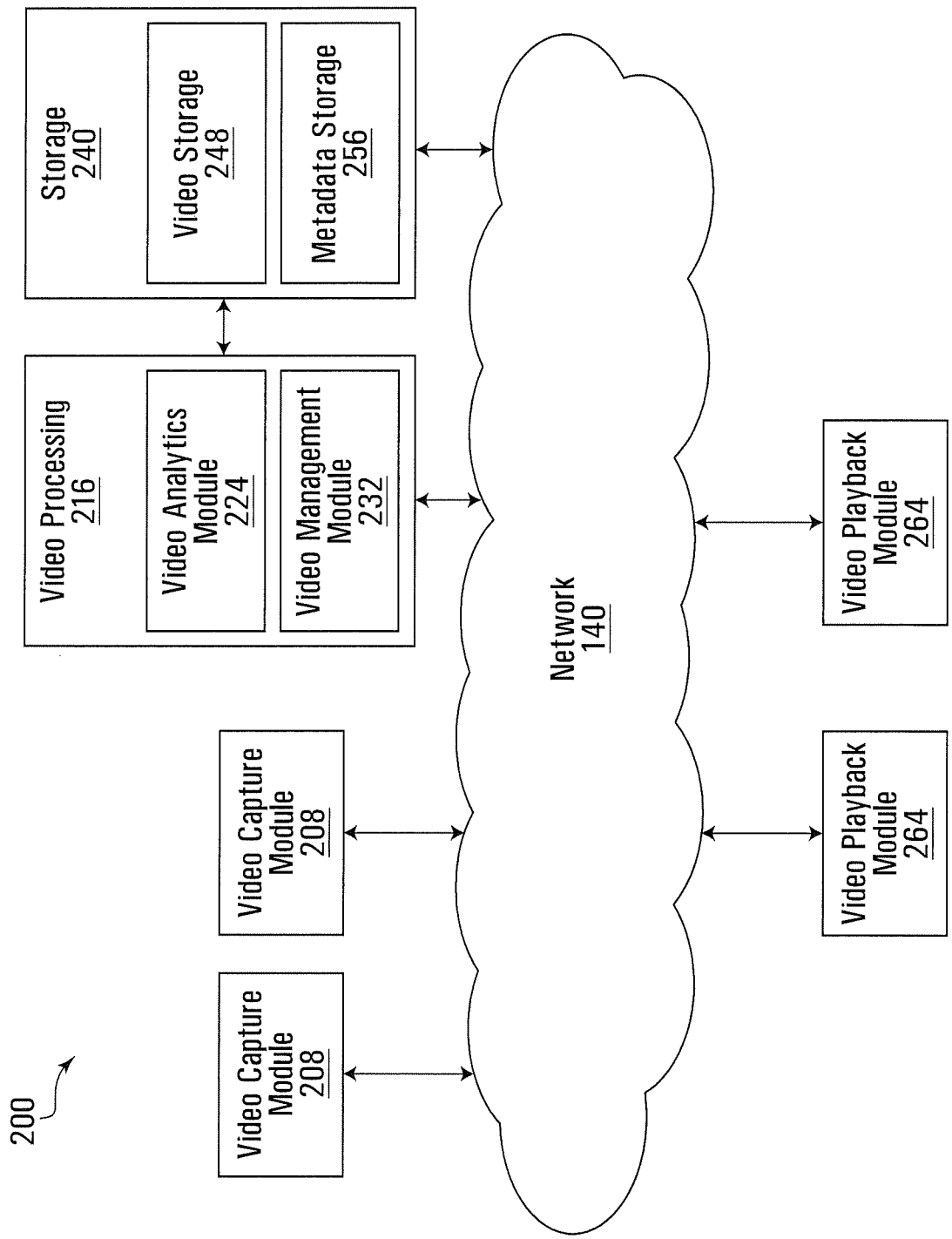
FIG. 2A illustrates a block diagram of a set of operational modules of the video capture and playback system according to one example embodiment.

Referring now to FIG. 2A, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules include at least one video capture module 208. For example, each video capture device 108 may implement a video capture module 208. The video capture module 208 is operable to control one or more components (such as, for example, sensor 116) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind" or "removed", unusual motion, and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage whereby logical rules are implemented to separate stored video from stored metadata. In other example embodiments, the video storage module 248 and/or the metadata storage module 256 may be implemented using hardware storage using a distributed storage scheme.

The set of operational modules further includes at least one video playback module 264, which is operable to receive image data and playback the image data as a video. For example, the video playback module 264 may be implemented on a client device 164.

The operational modules of the set 200 may be implemented on one or more of the image capture device 108, processing appliance 148, workstation 156, and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an image capture device 108, processing appliance 148 and workstation 156. Similarly, video management functionalities may be split between one or more of an image capture device 108, processing appliance 148 and workstation 156.

Figure 2B:
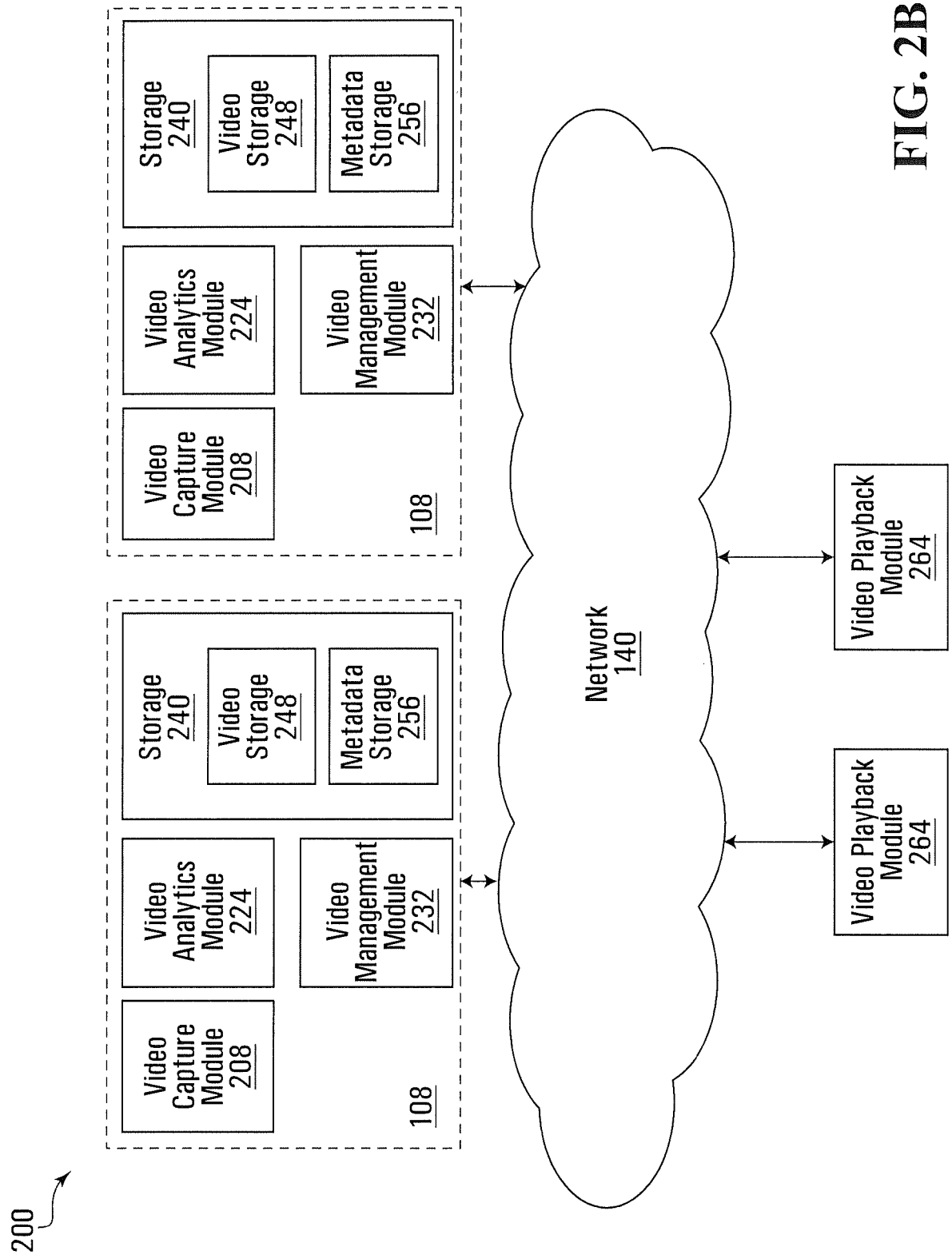
FIG. 2B illustrates a block diagram of a set of operational modules of the video capture and playback system according to one particular example embodiment wherein the video analytics module 224, the video management module 232 and the storage 240 is wholly implemented on the one or more image capture devices 108.

Referring now to FIG. 2B, therein illustrated is a block diagram of a set 200 of operational modules of the video capture and playback system 100 according to one particular example embodiment wherein the video analytics module 224, the video management module 232 and the storage 240 is wholly implemented on the one or more image capture devices 108. Alternatively, the video analytics module 224, the video management module 232 and the storage 240 is wholly or partially implemented on one or more processing appliances 148.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (such as, for example, manufacturers) or retrofitting an existing video capture and playback system.

In at least some example embodiments, it may be desirable to be able to determine an expected height of a person-of-interest ("POI height") in pixels who appears in an image captured by the camera 108. Knowledge of the expected POI height may be useful when performing object detection; for example, it may assist the video analytics module 224 in focusing on relevant targets, and consequently reduce the false positive detection rate and processing time. POI height can be predicted if all camera parameters are known, with camera parameters being divided into intrinsic parameters that are unaffected by camera positioning (e.g., focal length and sensor size) and extrinsic parameters that are affected by camera positioning (e.g., camera height, roll, and tilt). While the video analytics module 224 may often know all the required camera intrinsic parameters, often it does not know the extrinsic parameters. Determining the unknown camera parameters required to determine POI height is referred to herein as "camera calibration".

While there are a variety of conventional camera calibration methods, generally speaking those methods can be divided between those that require user interaction and automatic methods, which do not. The methods that require user interaction often involve manually placing objects with calibration patterns in the camera's 108 field of view, measuring distances between points in the camera's field of view, or manually marking up an image with lines; practically, those methods are inefficient.

The automatic methods can be subdivided into those that use detected objects for calibration, and those that use static, man-made structures for calibration. The methods that rely on detected objects often estimate the orientation of a line connecting a detected person's head and feet ("feet-to-head line"). In order to generate this line, these methods assume that foreground extraction has been performed on the detected person. Different foreground segmentation methods present different technical problems. For example, traditional computer vision methods of foreground segmentation require a large number of detections to compensate for noise; as another example, more modern deep learning methods of performing object segmentation are more accurate but are very computationally intensive and may not be suitable for an embedded system, such as the camera 108. Even assuming good segmentation accuracy, uncertainty in drawing the feet-to-head line prejudices calibration accuracy.

The automatic methods that rely on man-made structures for calibration determine locations of vanishing points from parallel straight lines, such as roads and edges of buildings, in an image captured by the camera 108. Many images simply lack a sufficient number of these lines to make these calibration methods feasible; and, even when they are feasible, they suffer from noise as a result of using computer vision edge detection methods to detect those lines.

In at least some of the embodiments described herein, a method for camera calibration is described that applies projective geometry to achieve practically sufficient calibration accuracy without requiring as much data as some conventional computer vision methods and without requiring deep learning object segmentation, thereby making it noise-robust and relatively computationally efficient.

Figure 3A:
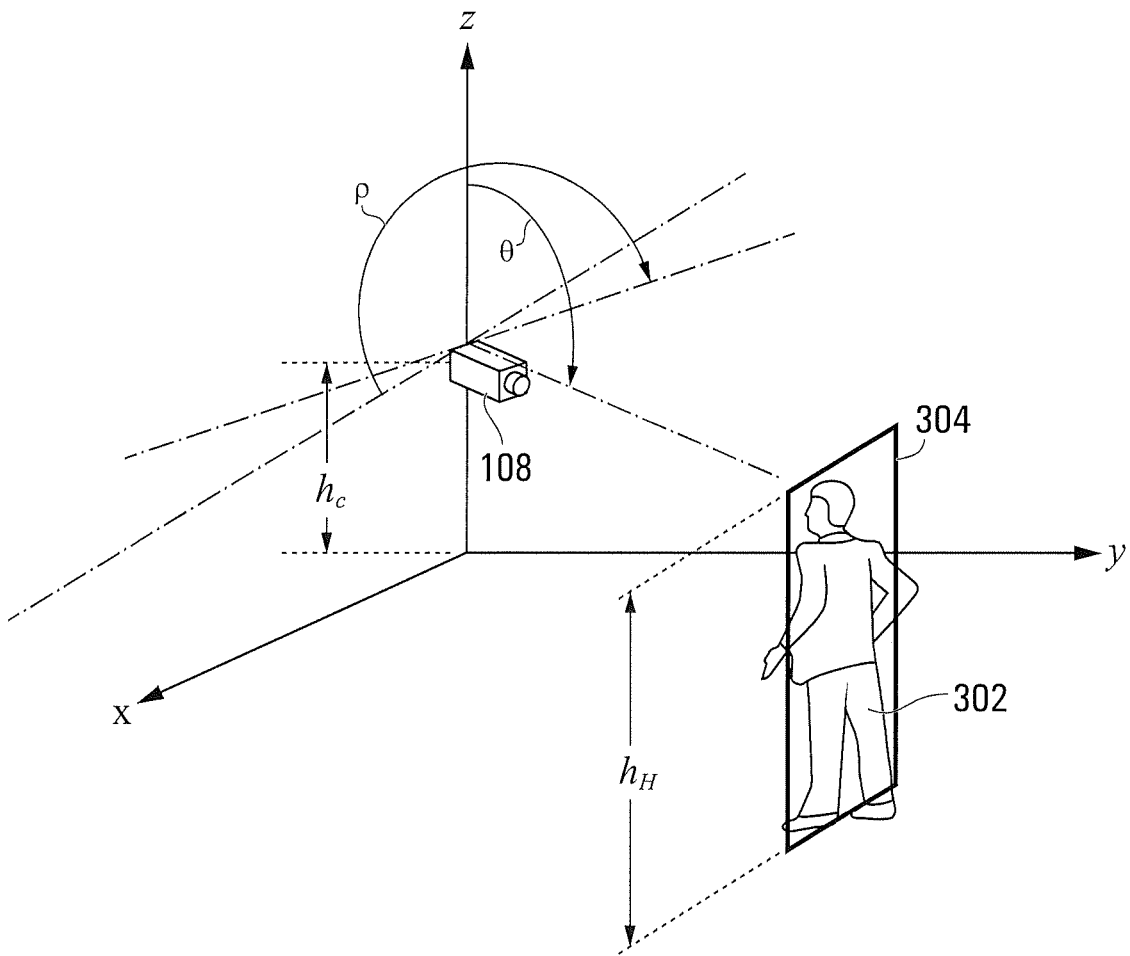
FIGS. 3A and 3B illustrate a camera that has detected a person represented by a rectangle (FIG. 3A) and by a parallelepiped (FIG. 3B), with the principal axis of the camera being perpendicular to the plane in which the rectangle (FIG. 3A) and a front face of the parallelepiped (FIG. 3B) reside, according to additional example embodiments.
Figure 3B:
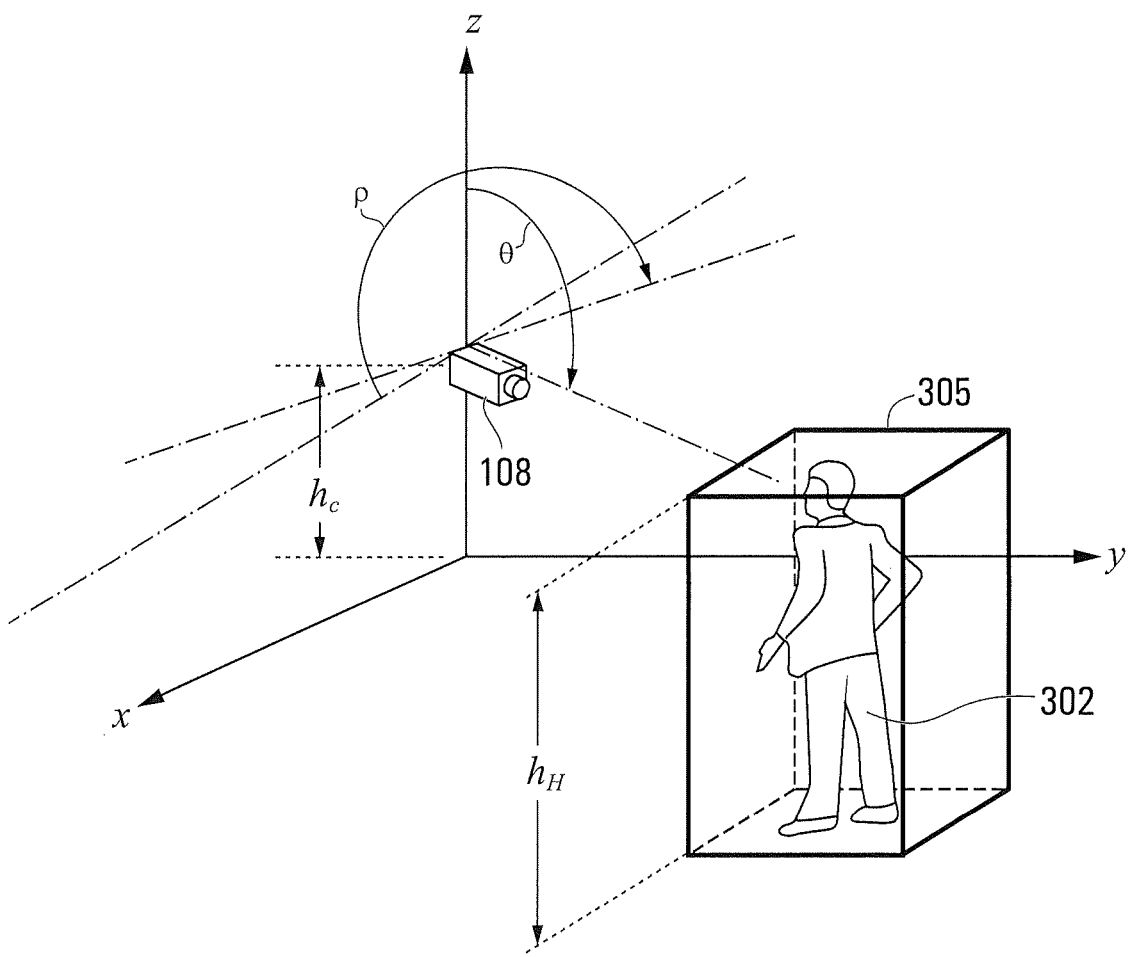

In at least some example embodiments, the camera calibration method estimates camera parameters based on multiple detections of one or more persons, with each detection being represented using a bounding box. The camera 108 is modeled as a pinhole camera. In typical situations, the method estimates extrinsic camera parameters (orientation angles tilt [η] and roll [ρ] [as depicted in FIGS. 3A and 3B, which is discussed further below], together with the camera height [$h_c$]), while the intrinsic camera parameters (focal length f and the camera sensor's 116 size in pixels), are presumed to be known. The sensor's 116 size in pixels may be determined based on sensor width ($w_{sen}$), sensor height ($h_{sen}$), and the resolution of the image (e.g., the video frame) with which calibration is performed ("calibration image"). In some other example embodiments, the focal length (f) may not be available for the video analytics module 224; this may be the case when the video analytics module 224 is processing video obtained using surveillance cameras with optical zoom. In at least some of those embodiments, the camera calibration method may estimate the focal length along with all extrinsic parameters. Alternatively, some extrinsic parameters of the camera 108 may be known. For example, cameras with gyroscopic sensors may provide the camera calibration method with tilt and roll angles.

The method is sufficiently robust to support various combinations of known and unknown extrinsic and intrinsic parameters that may be practically encountered. Generally speaking, the more parameters that are known, the better the calibration accuracy.

In at least some example embodiments, the camera parameters resulting from applying the camera calibration method may be used for estimating the heights of objects located on the ground plane and distances between points on the ground plane. For example, estimating object height may be useful to filter out false positive detections of persons based on the heights of those detections. Filtering false positives may also be done to some other objects such as vehicles: if the detected vehicle height is much smaller than the person height in the same location, that vehicle detection may also be filtered out as a false positive vehicle detection.

The ability to measure the distances on the ground plane may be useful for measuring the speed of objects, for tracking objects in world coordinates with an unscented Kalman filer, and for other applications.

Model and Assumptions

FIGS. 3A and 3B depict two example models that may be applied when performing automatic camera calibration. In FIGS. 3A and 3B, the ground is assumed to be flat: it is modelled by coordinate plane (X,Y) herein referred to as the "ground plane". The camera 108 is modeled as a pinhole camera for the purpose of projecting world coordinates (X,Y,Z) into image coordinates. The tilt of the camera 108 is θ, its roll is ρ, and its height is $h_C$ above the ground plane.

The height $h_H$ of a person detected by the video analytics module 224 is assumed. The automatic camera calibration can be done using detections of different persons, and it is assumed that all persons have approximately the same known height.

A person-of-interest 302 (herein interchangeably referred to simply as a "person 302") is modelled by a simple geometrical shape. Two models are considered. The first model uses a rectangle 304 having a height equal to the person height $h_H$ as the geometrical shape (see, e.g., FIG. 3A). The width of the rectangle 304 can be arbitrary and does not need to be defined as a model parameter as it is not involved in any computations of the camera parameters. The orientation of the rectangle 304 is assumed fixed for all person locations: the rectangle 304 remains parallel to coordinate plane (X,Z).

The second model is a parallelepiped 305 with the height equal to the person height $h_H$ (see, e.g., FIG. 3B). The width and depth of the parallelepiped 305 are equal: the projection of the parallelepiped 305 on the ground plane is a square, although in some other example embodiments the projection may be rectangular. Similar to the first model depicted in FIG. 3A, the values of width or depth of the parallelepiped 305 are irrelevant so long as they are equal to each other in the case of a square projection or have a fixed ratio in the case of a rectangular projection. Also similar to the first model of FIG. 3A, the orientation of the parallelepiped 305 is assumed to be the same for all person locations: the faces of the parallelepiped 305 are parallel to the coordinates planes (X,Z), (X,Y), and (Y,Z). The first model of FIG. 3A is hereinafter interchangeably referred to as the "2D model" and the second model of FIG. 3B is hereinafter interchangeably referred to as the "3D model".

Sources of Errors

Approximations involved in all assumptions discussed above are possible sources of error in at least some of the example approaches to automatic camera calibration described herein. Error may be caused by any one or more of person height variation, modeling the person 302 using the parallelepiped 305 or rectangle 304, the pinhole camera approximation, bounding box 408 detection by the system 100, and the ground plane not in fact being flat. Modelling the person 302 with a simple geometrical shape with fixed orientation is difficult to mathematically justify; nonetheless, experimentally it has been shown that the 2D and 3D models provide camera calibration accuracy within 5%-10% which is sufficient for practical applications, as discussed further below.

Automatic Camera Calibration Method

Figure 4A:
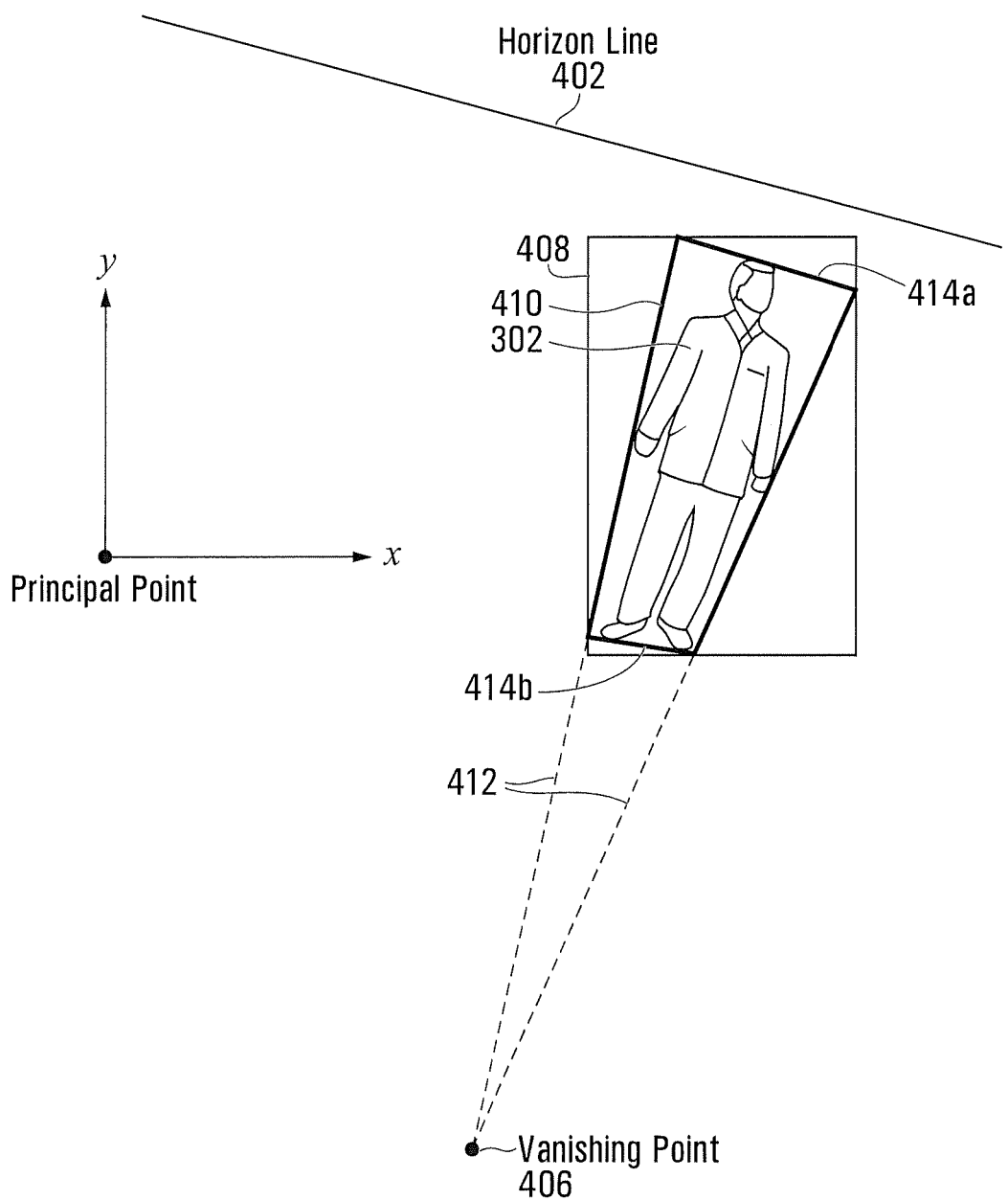
FIGS. 4A and 4B illustrate a projection of the rectangle of FIG. 3 into a trapezoid and of the parallelepiped of FIG. 3B, respectively.
Figure 4B:
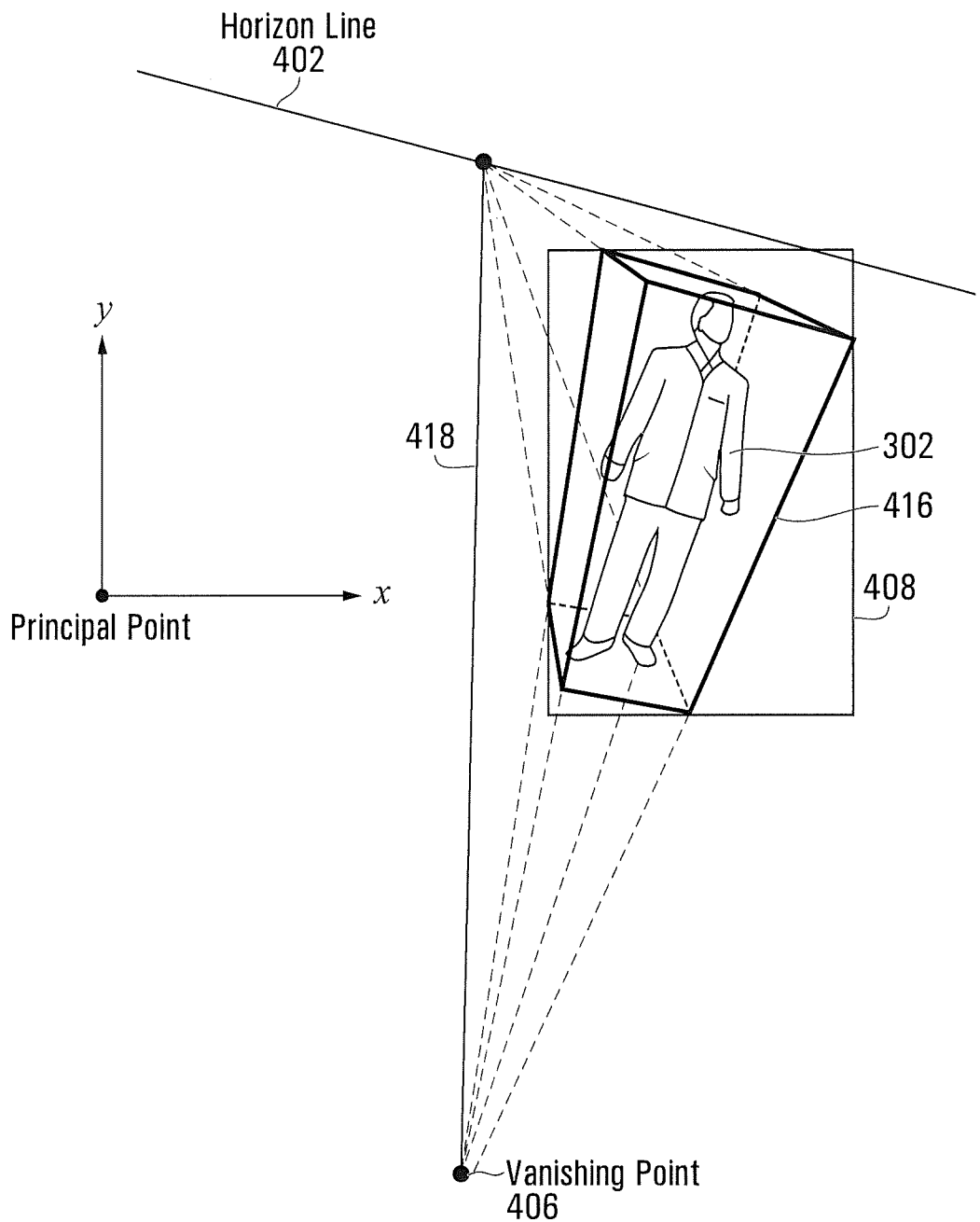

The video analytics module 224 detects a person 302 and identifies a bounding box 408 that encloses the person 302 in the image, which is depicted in FIGS. 4A and 4B. The automatic camera calibration method takes multiple bounding boxes 408 as input and determines the following camera 108 parameters: tilt θ, height $h_C$, roll ρ (if it is not already defined) and focal length f (if it is not already defined).

Figure 5A:
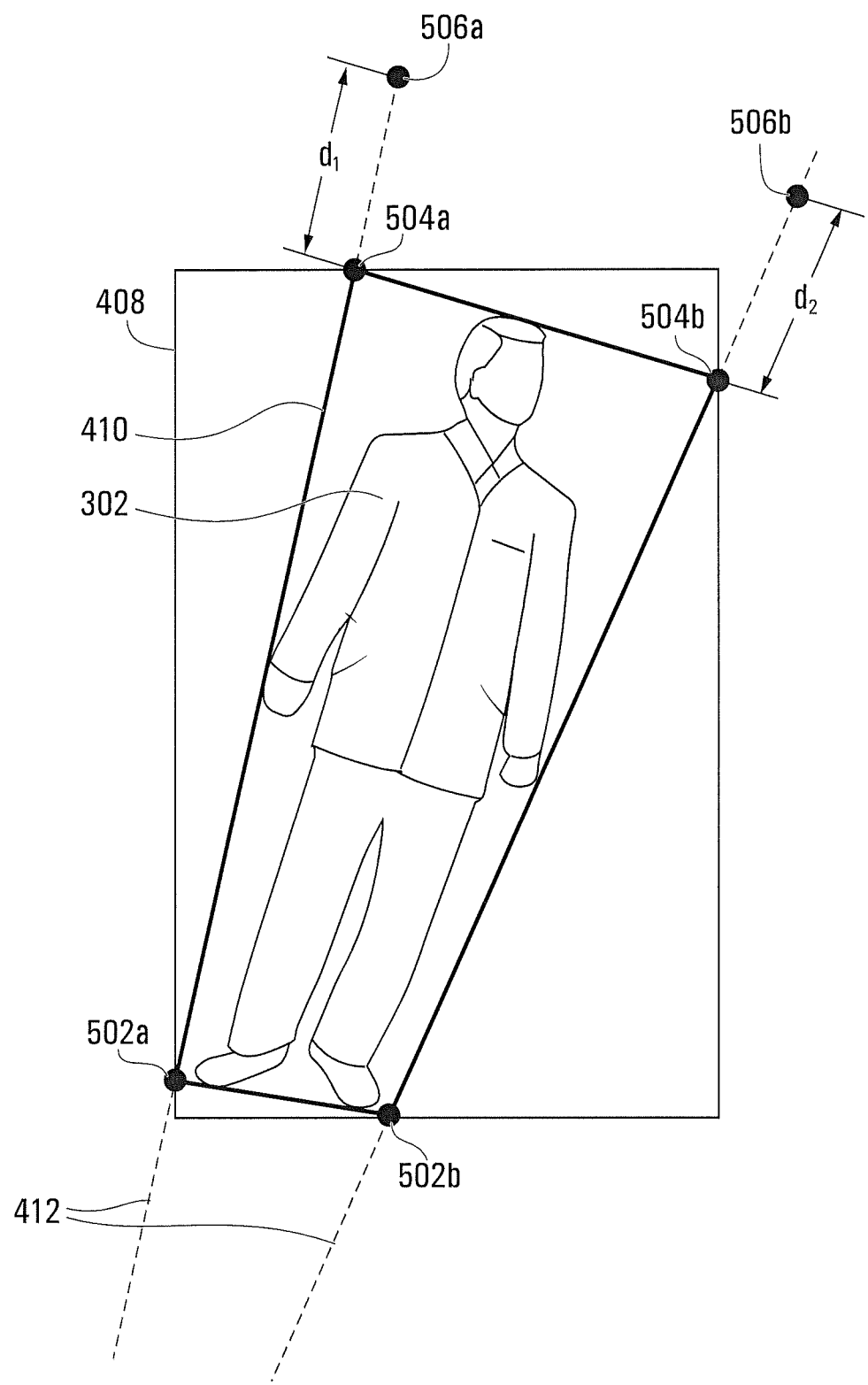
FIGS. 5A and 5B respectively show the projections of FIGS. 4A and 4B within a bounding box 408, with head vertices, feed vertices, and head vertex estimates highlighted.

FIG. 4A shows an example bounding box 408 that the video analytics module 224 generates in response to detecting a person 302. In the 2D model depicted in FIG. 3A, this bounding box 408 circumscribes a projection of the rectangle 304 into the image plane (x,y). The projected rectangle 304 is accordingly represented as a trapezoid 410. The top and bottom sides 414a,b of the trapezoid 410 are parallel to the horizon line 402. In FIG. 4A, the horizon line 402 has a negative slope, although in different embodiments such as those depicted in FIG. 7, the horizon line 402 may have zero slope or a positive slope. A pair of lines 412 extend from the left and right sides of the trapezoid 410 and converge below the bounding box 408 at a vanishing point 406. FIG. 5A is a detailed view of the bounding box 408 and trapezoid 410, with various vertices highlighted as discussed further below. In at least some example embodiments, the horizon line 402 is assumed to be horizontal so that roll angle can be approximated by either ρ=0 or 180° depending on a chosen system of coordinates.

FIG. 4B shows another example bounding box 408 that the video analytics module 224 generates in response to detecting a person 302. In the 3D model depicted in FIG. 3B, this bounding box 408 circumscribes a projection 416 of the parallelepiped 305 into the image plane (x,y). The projections of all edges of the parallelepiped 305 are shown in FIG. 4B. The lines of the projection 416 corresponding to the parallelepiped's 305 horizontal edges parallel to the x axis in FIG. 3B are parallel to the horizon line 402 in FIG. 4B. The lines of the projection 416 corresponding to the vertical edges of the parallelepiped 305 in FIG. 3B converge below the bounding box 408 at the vanishing point 406 in FIG. 4B. The edges of the projection 416 corresponding to the parallelepiped's 305 horizontal edges parallel to the y axis in FIG. 3B converge above the bounding box 408 at the point of intersection between the horizon line 402 and a line 418 drawn from the vanishing point 406, parallel to the y axis of FIG. 4B, to the horizon line 402.

Figure 18:
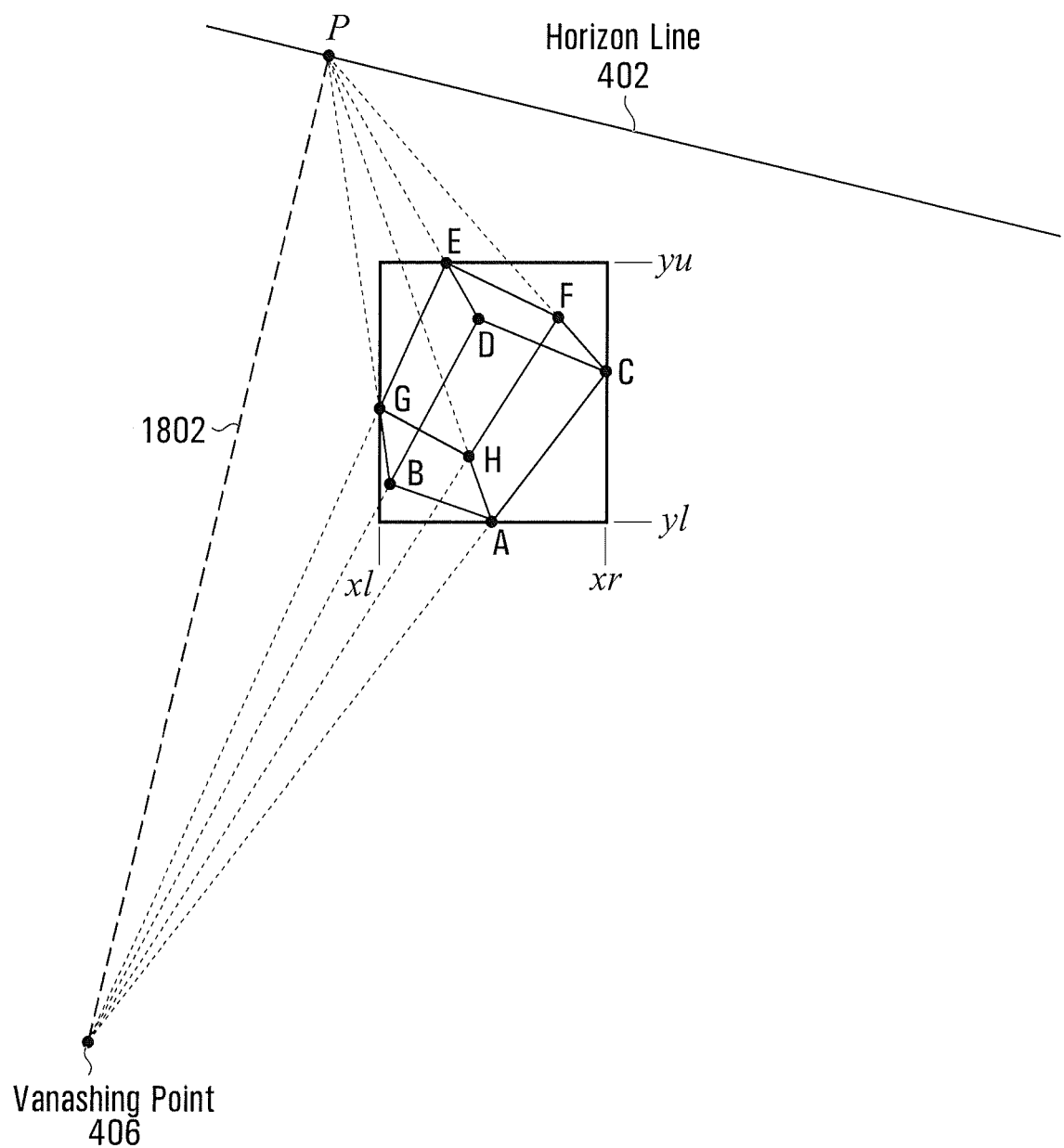
FIG. 18 depicts a projection of a parallelepiped with vertices highlighted and generated from an image having a horizon line with negative slope.
Figure 19:
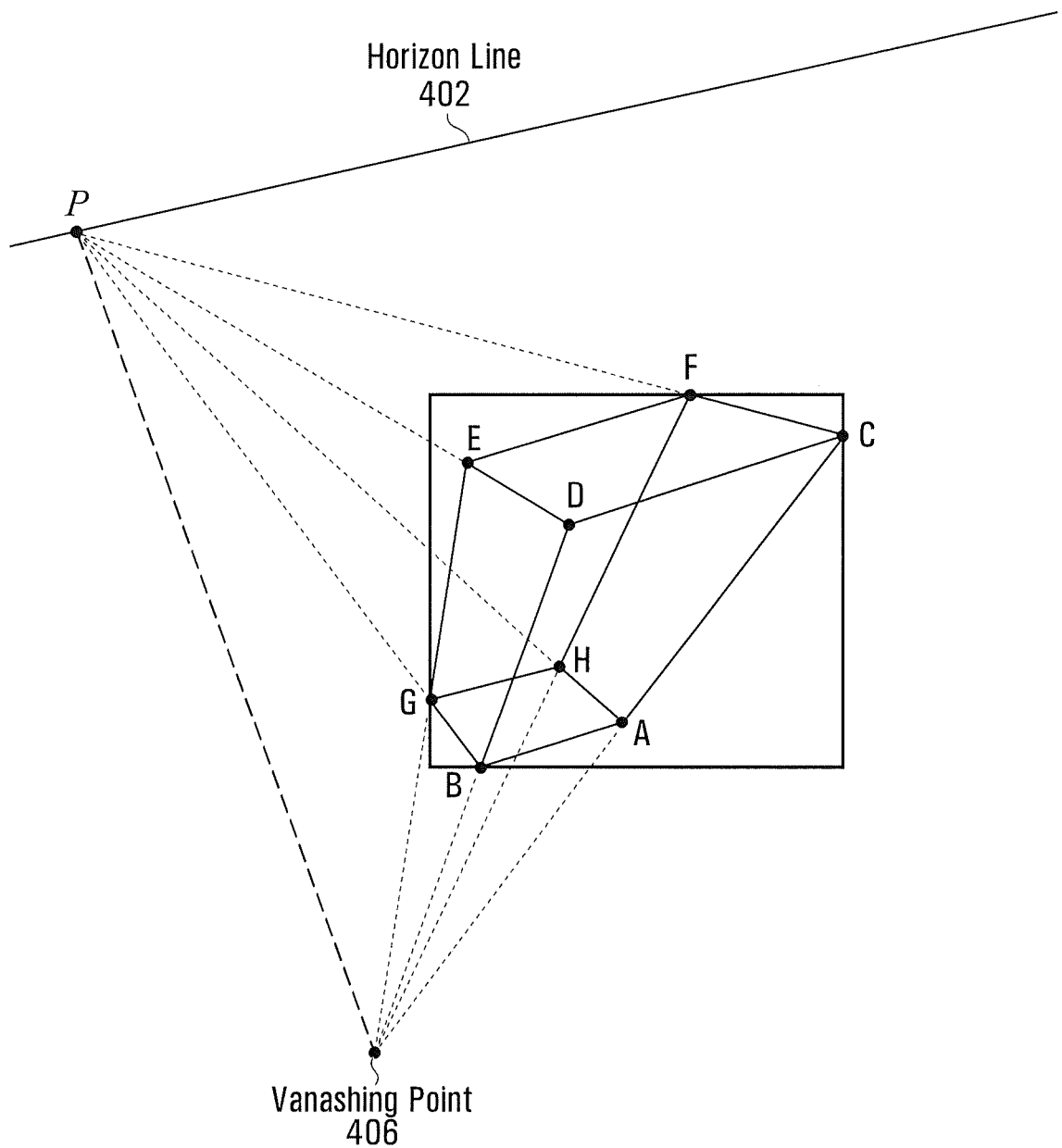
FIG. 19 depicts a projection of a parallelepiped with vertices highlighted and generated from an image having a horizon line with positive slope.

Similar to FIG. 4A, in FIG. 4B the horizon line 402 has a negative slope, and the bounding box 408 is located to the right of the vanishing point 406. As with the 2D model, other configurations are possible. Two example different configurations are depicted in FIGS. 18 and 19 and discussed further below.

Figure 17:
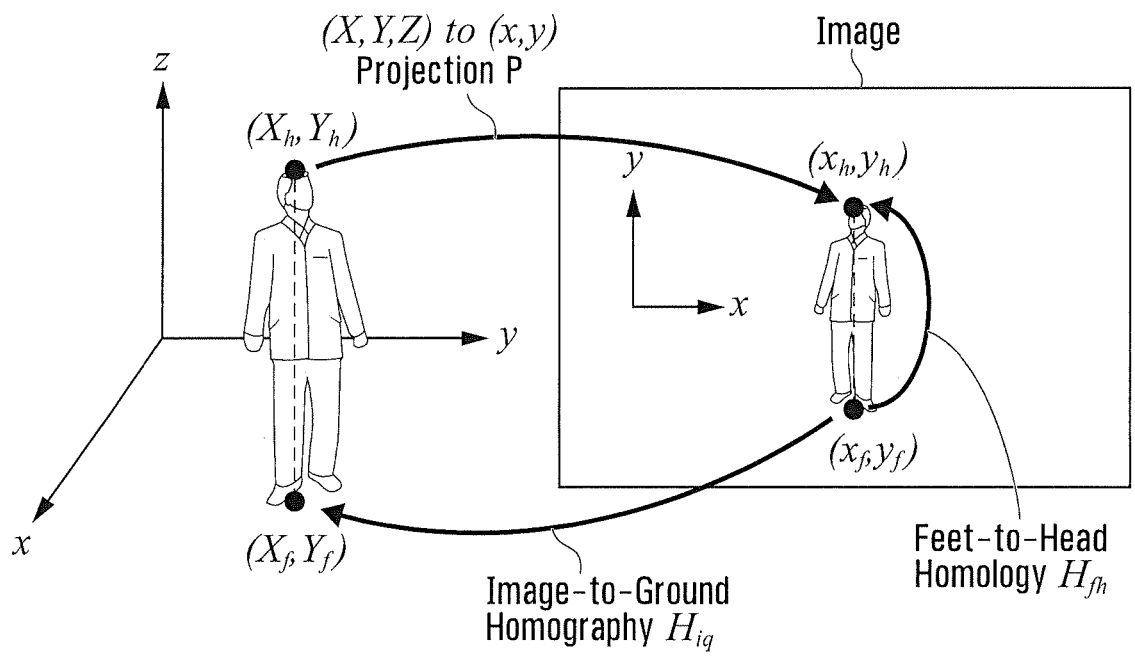
FIG. 17 depicts the relationship between points in the world coordinate system and the image coordinate system, and between points representing the head and the feet of a person represented in the image coordinate system.

The camera parameters define the projection P of world coordinates (X,Y,Z) to image coordinates (x,y) as depicted in FIG. 17 as the following:

$$\begin{pmatrix} xw \\ yw \\ w \end{pmatrix} = P \begin{pmatrix} X \\ Y \\ Z \\ 1 \end{pmatrix} \quad (1)$$

$$P = \begin{pmatrix} f\cos\rho & -f\sin\rho\cos\theta & f\sin\rho\sin\theta & -f\dfrac{h_C}{h_H}\sin\rho\sin\theta \\ f\sin\rho & f\cos\rho\cos\theta & -f\cos\rho\sin\theta & f\dfrac{h_C}{h_H}\cos\rho\sin\theta \\ 0 & \sin\theta & \cos\rho & -\dfrac{h_C}{h_H}\cos\rho \end{pmatrix} \quad (2)$$

where coordinates are written in homogeneous form: w is a non-zero constant that is involved in all transformations of homogeneous coordinates.

Several formulas that can be derived from the projective transformation (Equations (1) and (2)) are presented below. The homogeneous coordinates of the vanishing point 406 $\tilde{v}$ (the point 406 in FIGS. 4A and 4B) can be written as:

$$\tilde{v} = [f\sin(\rho)\sin(\theta); f\cos(\rho)\sin(\theta); \cos(\theta)]^T \qquad (3)$$

The horizon line 402 $\tilde{l}$ (shown in FIGS. 4A and 4B) in homogeneous coordinate form can be written as $$\tilde{l} = [\sin(\rho)\sin(\eta); -\cos(\rho)\sin(\theta); f\cos(\theta)]^T \qquad (4)$$

In Equations (3) and (4) T denotes a transposed vector and $\tilde{v}$ and $\tilde{l}$ are column vectors. Inhomogeneous coordinates of the vanishing point 406 v and the slope c of the horizon line 402 in relation to the x axis of the image plane as depicted in FIGS. 4A and 4B can be written as $$v = [f\sin(\rho)\tan(\theta); -f\cos(\rho)\tan(\theta)]^T \qquad (5)$$

$$c = -\tan(\rho) \qquad (6)$$

The homology transformation $H_{fh}$ maps the image projections $(x_f, y_f)$ of the points on the ground plane $((X,Y,Z=0)$ in FIGS. 3A and 3B) to the image projections $(x_h, y_h)$ of corresponding points on the horizontal plane $(X,Y,Z=h_H)$ as depicted in FIG. 17; the subscript "f" stands for "feet" (i.e., the ground plane), and the subscript "h" represents the "head" plane. The homology transformation $H_{fh}$ can be written as:

$$\begin{pmatrix} x_h w \\ y_h w \\ w \end{pmatrix} = H_{fh} \begin{pmatrix} x_f \\ y_f \\ 1 \end{pmatrix} \qquad (7)$$

$$H_{fh} = I - \frac{h_H}{h_C} \frac{\tilde{v}\tilde{l}^T}{\tilde{v}^T \tilde{l}} \qquad (8)$$

where I is a 3×3 identity matrix, $\tilde{v}\tilde{l}^T$ is the vector outer product (a 3×3 matrix), $\tilde{v}^T\tilde{l}$ is a vector dot product (a scalar), and w is a non-zero constant. Image points $(x_f, y_f)$ are referred to herein as "foot plane" points, the points $(x_h, y_h)$ as "head plane" points and the homology transformation $H_{fh}$ as a feet-to-head homology.

The homography $H_{iq}$ transformation maps an image plane point $(x_f, y_f)$ to its corresponding point on the ground plane $(X,Y,Z=0)$ as shown in FIGS. 3A and 3B. $(X_f, Y_f)$ as depicted in FIG. 17:

$$\begin{pmatrix} X_f w \\ Y_f w \\ w \end{pmatrix} = H_{iq} \begin{pmatrix} x_f \\ y_f \\ 1 \end{pmatrix} \qquad (9)$$

$$H_{iq} = \begin{pmatrix} f\cos\rho & -f\sin\rho\cos\theta & -f\frac{h_C}{h_H}\sin\rho\sin\theta \\ f\sin\rho & f\cos\rho\cos\theta & f\frac{h_C}{h_H}\cos\rho\sin\theta \\ 0 & \sin\theta & -\frac{h_C}{h_H}\cos\rho \end{pmatrix} \qquad (10)$$

The homography transformation $H_{iq}$ is referred to herein as an image-to-ground homography.

If all values of the unknown camera parameters are available, the camera projection matrix P (Equation (2)) and all camera projection characteristics are defined. In such a case, the projections for vertices of the geometric shape used to model the person 302 (rectangle 304 or parallelepiped 305) for each bounding box 408 can be calculated from the horizon line 402 slope (Equation (6)), the vanishing point 406 (Equation (5)) and image-to-ground homography (Equation (10)). The image-to-ground homography (Equation (10)) is required only for the 3D model; for the 2D model the horizon line 402 slope (Equation (6)) and the vanishing point 406 (Equation (5)) suffice for the vertices' projection calculation. If the feet-to-head homology (Equations (7) and (8)) is applied to the bottom (feet) vertices (vertices 502a,b in FIG. 5A for the 2D model and vertices 502a,b,c,d in FIG. 5B for the 3D model), the top (head) vertices' projections (vertices 504a,b in FIG. 5A for the 2D model and vertices 504a,b,c,d in FIG. 5B for the 3D model) are obtained. If approximate values for the unknown camera parameters are available, the projections of the vertices of the rectangle 302 or parallelepiped 305 can be calculated in the same way based on approximated values of those camera parameters. However, the projection of the points obtained from the approximated feet-to-head homology transformation (vertex estimates 506a,b in FIG. 5A for the 2D model and vertex estimates 506a,b,c,d in FIG. 5B for the 3D model) will be different from the top vertices' projections (vertices 504a,b in FIG. 5A for the 2D model and vertices 504a,b,c,d in FIG. 5B for the 3D model). The distance between the top vertices' projections and the points obtained using the feet-to-head homology ($d_1$ and $d_2$ in FIG. 5A for the 2D model; $d_1$, $d_2$, $d_3$ and $d_4$ in FIG. 5B for the 3D model) can be considered as a measure of error in the values of unknown camera parameters. Thus, the error defined through these distances (e.g., as the sum of the squared distances) can be minimized by varying the unknown camera parameters. Therefore, an optimization problem can be formulated with this error as the cost function.

In practice, there are several possible reasons for the difference in top vertices' projections calculated from the bounding box 408 and the points obtained using the feet-to-head homology besides inaccurate unknown camera parameters. For example, the difference may be caused by any one or more of the following: the person 302 detections by the video analytics module 224 as represented by the bounding boxes 408 may not be accurate; the height of persons 302 detected in the bounding box 408 may differ from the person height $h_H$ used in the model; errors in modeling a real person by a simple geometrical figure (a rectangle 304 in the 2D model and parallelepiped 305 in the 3D model) with fixed orientation; and errors resulting from modeling the camera 108 as a pinhole camera. In at least some example embodiments, a large part of the error represented by the distances $d_1$ and $d_2$ for the 2D model (FIG. 5A) or the distances $d_1$, $d_2$, $d_3$ and $d_4$ for the 3D model (FIG. 5B) is due to inaccurate approximations of the unknown parameters, which may be iteratively reduced by tuning them.

Figure 15:
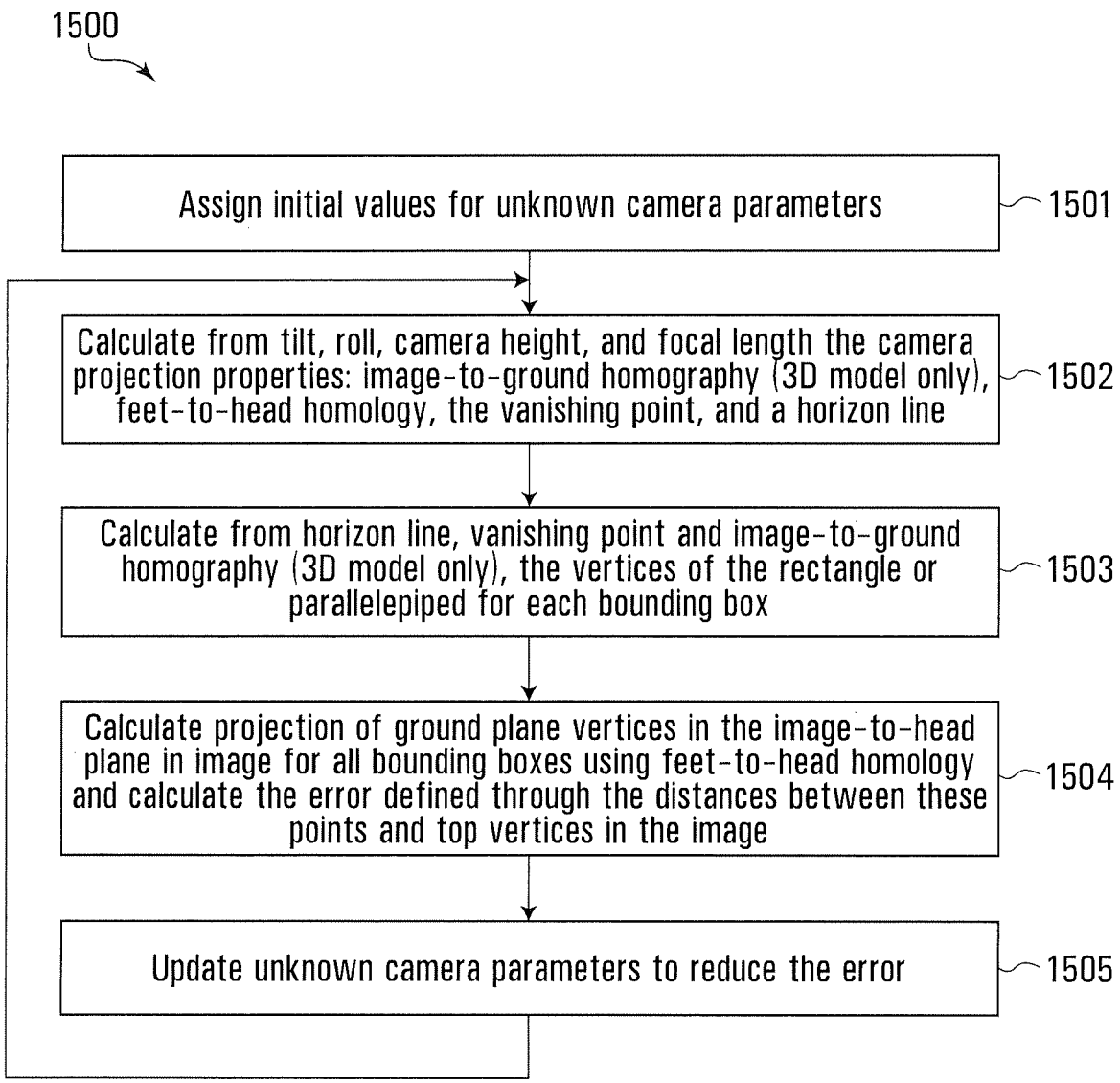
FIG. 15 depicts a method for calibrating a camera using bounding boxes, according to an example embodiment.
Figure 16:
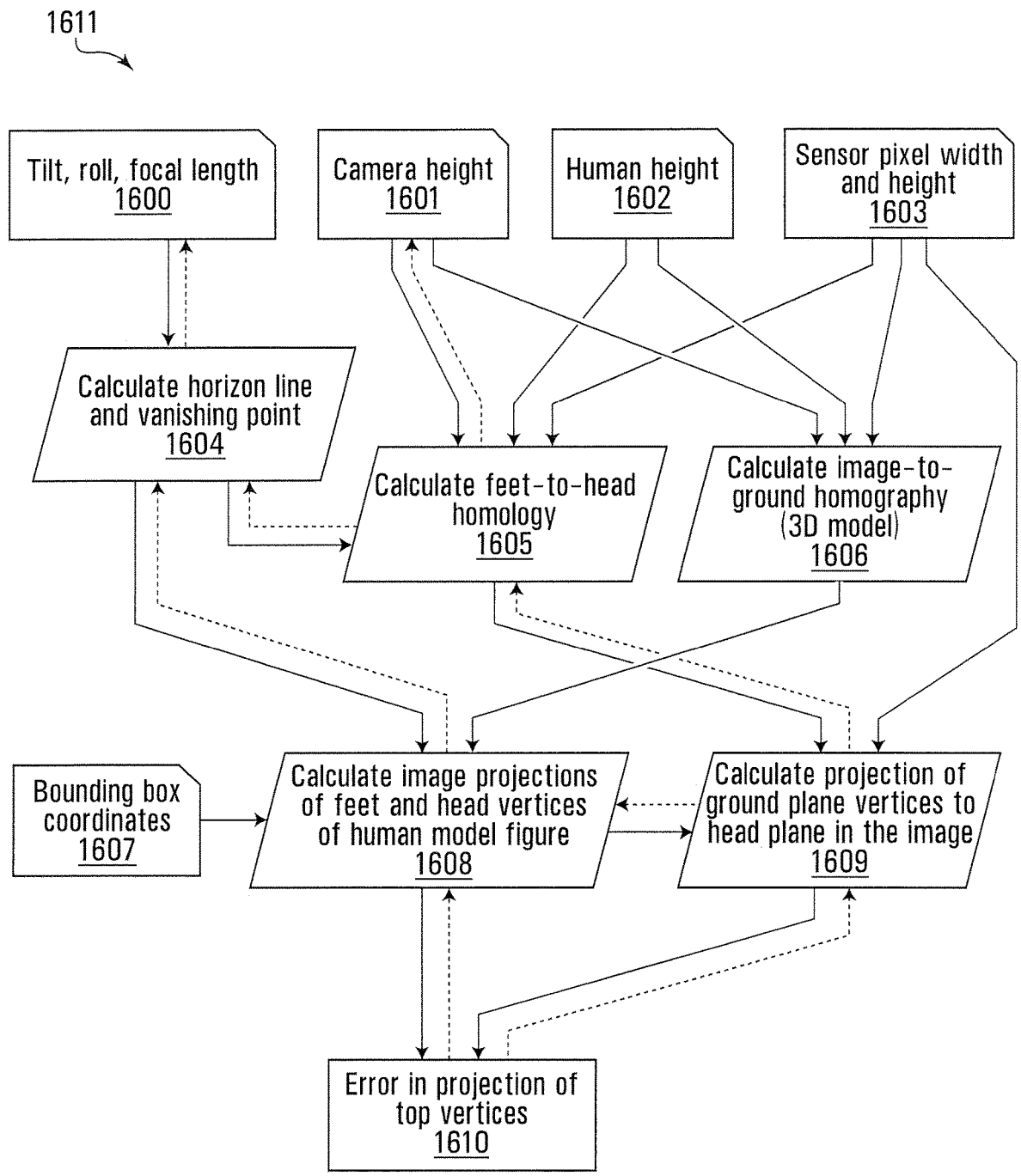
FIG. 16 depicts a computational graph for calibrating a camera using bounding boxes 408, according to an example embodiment.

Referring now to FIG. 15, there is shown an example method 1500 for performing camera calibration using bounding boxes 408. FIG. 16 shows a computational graph 1611, which is consistent with the method 1500, for performing camera calibration using bounding boxes 408. Solid lines in the computational graph 1611 depict the calculation of the error (forward propagation). The dashed lines depict the backpropagation flow for calculating the derivative of the error with respect to the optimization parameters for the 2D model. The method 1500 in FIG. 15 and the computational graph 1611 in FIG. 16 are related in that the former describes the optimization method used for camera calibration, while the latter describes the mathematical computations comprising one optimization iteration of the method 1500.

Starting from some initial values for the unknown parameters (which are interchangeably referred to herein as the "optimization parameters") (block 1501), one iteration of numerical optimization comprises calculating all characteristics of camera projections (horizon line 402, vanishing point 406, feet-to-head homology, and image-to-ground homography) (block 1502); calculating the projections of the vertices of the geometric shape used to model the person 302 (rectangle 304 or parallelepiped 305) to the image for each bounding box 408 (block 1503); calculating the projections of ground plane vertices in the image to the corresponding head plane points in the image for all bounding boxes 408, and calculating the error defined through the distances between these points and the top head vertices 504 projection in the image (block 1504); and finally updating optimization parameters to reduce the error (block 1505). After block 1505, the method 1500 may return to block 1502 so the camera parameters may be iteratively tuned.

Below, the method 1500 and computational graph 1611 are described in more detail, followed by a description of the mathematical formulations applied when performing each.

In the computational graph 1611, the video analytics module 224 obtains all three camera parameters (tilt, roll, and focal length) (block 1600), and from them determines the horizon line 402 (Equation (4)) and vanishing point 406 (Equation (3)) (block 1604). As discussed above, the video analytics module 224 uses the predefined and fixed focal length if it is known or uses the value obtained in the last iteration of the method 1500 if the focal length is unknown. The video analytics module 224 determines a feet-to-head homology matrix (Equation (8)) (block 1605) and image-to-ground homography (Equation (10)) (block 1606) from the height of the camera 108 (block 1601) and the presumed height of the person 302 (block 1602) and the dimensions of the sensor 116 in pixels (block 1603). Feet-to-head homology calculations (block 1605) also use the horizon line 402 and vanishing point 406 calculated in block 1604.

Figure 5B:
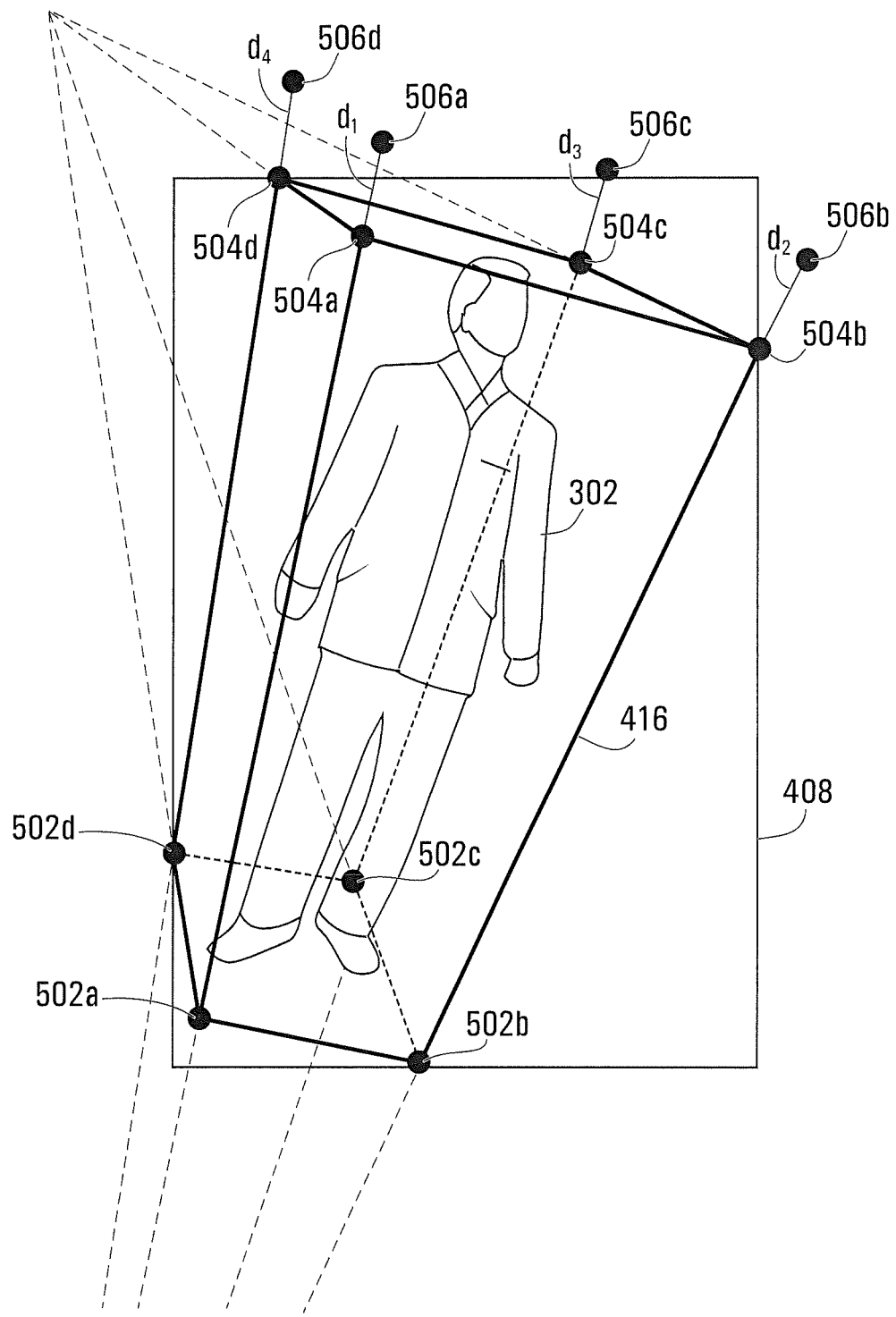

The video analytics module 224 determines (in block 1608 in FIG. 16 and block 1503 in FIG. 15) the projections of the vertices of the geometric shape used to model the person 302 (the rectangle 304 for the 2D model or parallelepiped 305 for the 3D model) to foot and head vertices 502*a,b*, 504*a,b* for the 2D model in FIG. 5A or foot and head vertices 502*a,b,c,d*, 504*a,b,c,d* for the 3D model in FIG. 5B. The ground plane vertices 502*a,b* or 502*a,b,c,d* are nearer to the feet of the person 302 than the head plane vertices and the head plane vertices 504*a,b* or 504*a,b,c,d* are nearer to a head of the person 302 than the ground plane vertices. The calculations of these points are based on geometrical properties of the relative location of the bounding box 408, the horizon line 402 and the vanishing point 406 for the 2D model. For the 3D model the calculation in block 1608 uses the image-to-ground homography (block 1606) as well. In the 2D model the calculation of image-to-ground homography (block 1609) is not required. All calculations in block 1608 are done for all available bounding boxes 408 (block 1607). Blocks 1604, 1605, and 1606 in FIG. 16 correspond to block 1502 in FIG. 15, and block 1608 in FIG. 16 corresponds to block 1503 in FIG. 15. The calculations in block 1608 are discussed in more detail below.

Using the feet-to-head homology (block 1605), the video analytics module 224 calculates (in block 1609 in FIG. 16 and block 1504 in FIG. 15) head vertex estimates as the projections of foot plane points to head plane points: foot vertices 502*a,b* for the 2D model in FIG. 5A and foot vertices 502*a,b,c,d*, for the 3D model in FIG. 5B are projected to head vertex estimates 506*a,b* for the 2D model in FIG. 5A and head vertex estimates 506*a,b,c,d* for the 3D model in FIG. 5B, respectively.

The video analytics module 224 calculates the distances between feet-to-head projections calculated in block 1609 (head vertex estimates 506*a,b* in FIG. 5A and head vertex estimates 506*a,b,c,d* in FIG. 5B) and perspective geometry projections of head vertices calculated in block 1608: head vertices 504*a,b* in the 2D model in FIG. 5A or head vertices 504*a,b,c,d* in FIG. 5B. Then the video analytics module 224 calculates the error defined through these distances (block 1610). Blocks 1609 and 1610 in FIG. 16 correspond to block 1504 in FIG. 15. The error may be defined as the sum of the squared distances or sum of the relative errors (the distances normalized by lengths of sides of the projections that correspond to the vertical edges of the rectangle 304 in the 2D model or corresponding lengths of the parallelepiped 305 in the 3D model). The error calculations are described below in more detail.

The optimization parameters are updated in block 1505 based on a suitable optimization method and the calculations resume with updated optimization parameters in block 1502. The iterations continue until the minimum of the error as a function of optimization parameters is reached. While in at least some example embodiments error is minimized, in at least some other example embodiments error is simply reduced relative to error corresponding to the initial parameter values.

In at least some example embodiments, the unknown camera parameters may include some of or all the following: camera tilt, roll, focal length, and camera height, while the width and height of the image sensor 116 in pixels are a known camera parameter. In at least some other embodiments, the focal length may be known, and roll can be assumed equal to $\rho=180°$. The example 1500 method described above in respect of FIGS. 15 and 16 may be applied for all suitable combinations of known and unknown parameters. As discussed below, experimentally the accuracy of the method 1500 is better if the focal length is known.

2D Model: Determining Vertices of the Trapezoid 410

Figure 6:
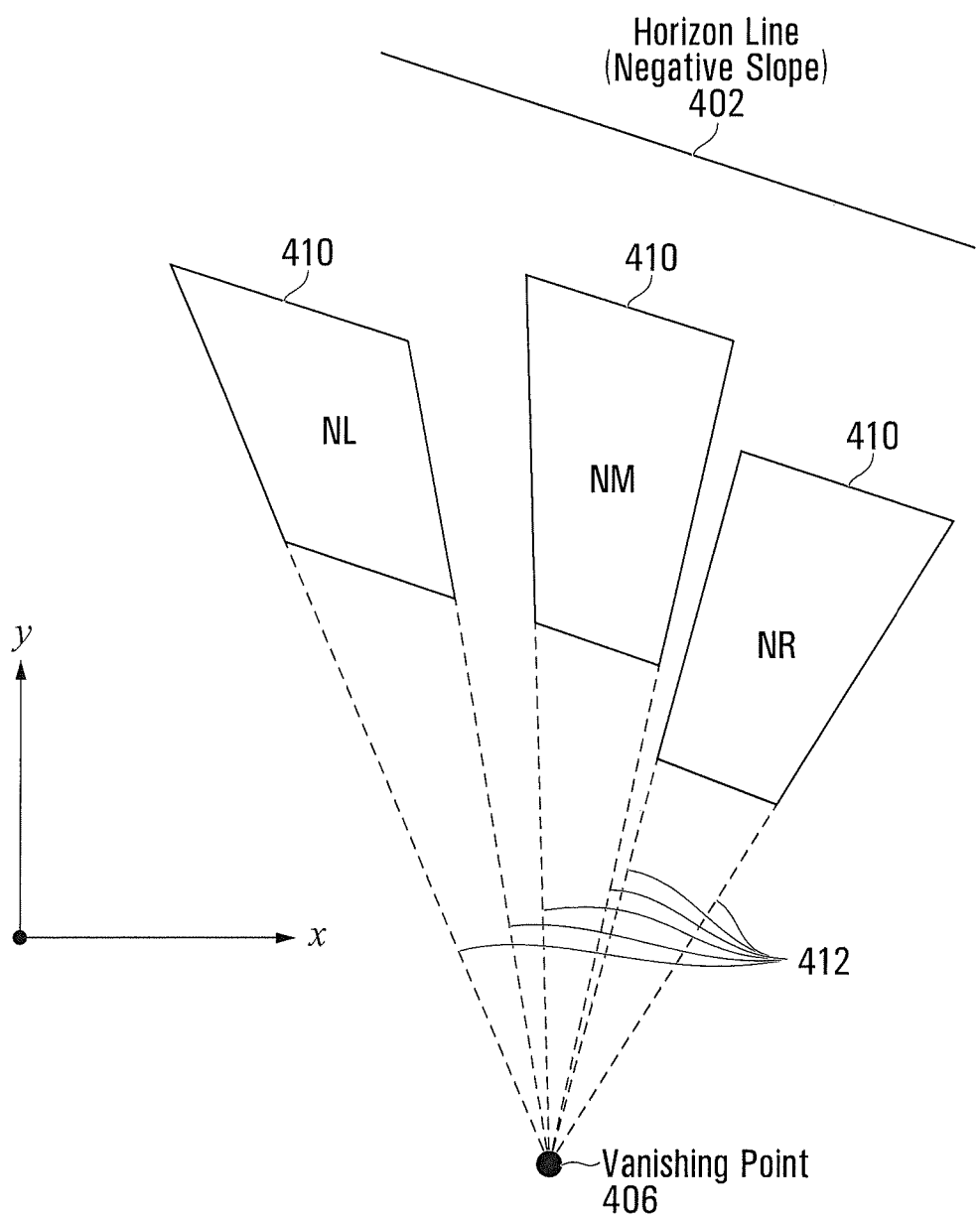
FIG. 6 depicts three trapezoids generated from images having a horizon line with negative slope, with each positioned differently relative to a common vanishing point.
Figure 7:
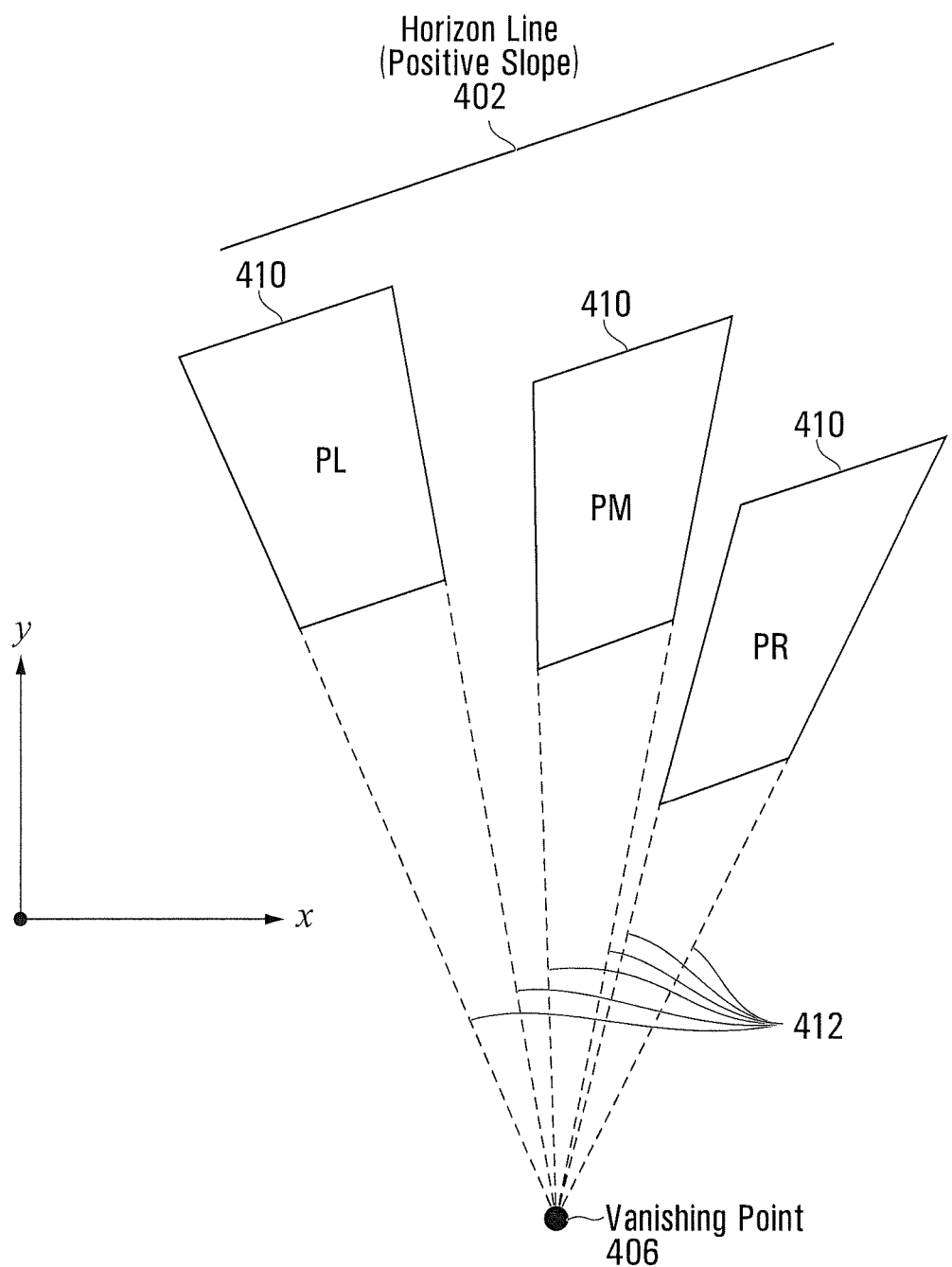
FIG. 7 depicts three trapezoids generated from images having a horizon line with positive slope, with each positioned differently relative to a common vanishing point.

FIG. 6 shows three trapezoids 410 each positioned differently relative to the vanishing point 406 for a horizon line 402 with negative slope, while FIG. 7 shows three trapezoids 410 each positioned differently relative to the vanishing point 406 for a horizon line 402 with positive slope. In FIG. 6, the top and bottom sides 414*a,b* of the trapezoids 410 have negative slopes that correspond to the horizon line's 402 slope, and each of the left and right sides of the trapezoids 410 is aligned with one of the lines 412 leading to the vanishing point 406. The three trapezoids 410 in FIG. 6 are labeled "NL", "NM", and "NR". For each trapezoid 410, the "N" represents that the negative slope of that trapezoid's 410 top and bottom sides 414*a,b*. The "L" of the NL trapezoid 410 represents that the left and right sides of the trapezoid 410 are both on the left side of the vanishing point 406. The "R" of the NR trapezoid 410 represents that the left and right sides of the trapezoid 410 are both on the right side of the vanishing point 406. The "M" of the NM trapezoid 410 represents that the left side of the trapezoid 410 is on the left side of the vanishing point 406, and that the right side of the trapezoid 410 is on the right side of the vanishing point 406. In FIG. 7, the top and bottom sides 414*a,b* of the trapezoids 410 have positive slopes that correspond to the horizon line's 402 slope, and each of the left and right sides of the trapezoids 410 is aligned with one of the lines 412 leading to the vanishing point 406. The three trapezoids 410 in FIG. 7 are labeled "PL", "PM", and "PR". For each trapezoid 410, the "P" represents that the positive slope of that trapezoid's 410 top and bottom sides 414a,b. The "L" of the PL trapezoid 410 represents that the left and right sides of the trapezoid 410 are both on the left side of the vanishing point 406. The "R" of the PR trapezoid 410 represents that the left and right sides of the trapezoid 410 are both on the right side of the vanishing point 406. The "M" of the PM trapezoid 410 represents that the left side of the trapezoid 410 is on the left side of the vanishing point 406, and that the right side of the trapezoid 410 is on the right side of the vanishing point 406.

Figure 8A:
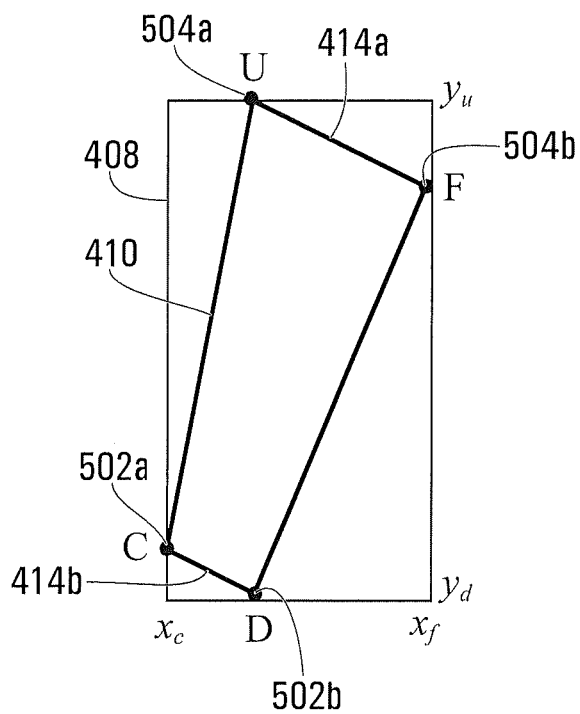
Figure 8B:
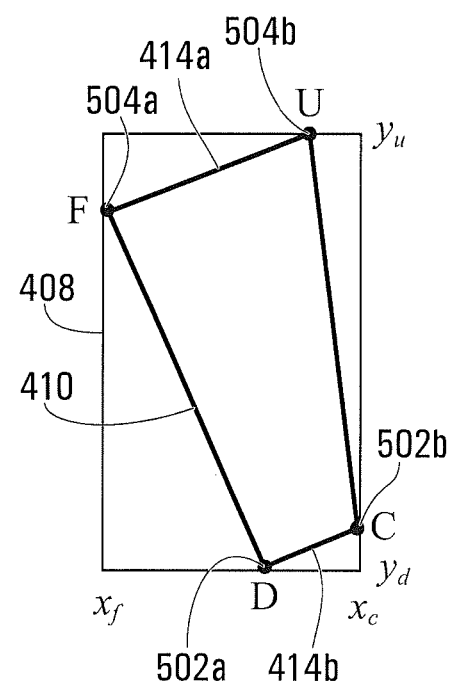

FIGS. 8A and 8B depict the NR and PL trapezoids 410, respectively, each within a bounding box 408; FIGS. 9A and 9B depict the NL and PR trapezoids 410, respectively, each within a bounding box 408; and FIGS. 10A and 10B depict the NM and PN trapezoids 410, respectively, each within a bounding box 408. The method that the video analytics module 224 applies to determine the locations of the foot vertices 502a,b and head vertices 504a,b is described in further detail below with respect to 1) FIGS. 8A and 8B, 2) FIGS. 9A and 9B, and 3) FIGS. 10A and 10B.

For the NR and PL trapezoids 410 of FIGS. 8A and 8B, the higher one of the head vertices 504a,b is denoted as U, and the lower one of the foot vertices 502a,b is denoted as D. Of the remaining vertices 502a,b, 504a,b, the one that is closer to the vanishing point 406 is denoted as C and the one that is farther from the vanishing point 406 and closer to the edge of the image is denoted as F. The horizontal coordinate of the bounding box's 408 vertical side that is closer to the vanishing point 402 is denoted $x_c$ and the horizontal coordinate of the vertical side that is farther from the vanishing point 402 and closer to the edge of the image is denoted as $x_e$. The vertical coordinates of the top and bottom sides 414a,b of the bounding box 408 are denoted as $y_u$ and $y_d$. To simplify calculations the center of the image coordinate system is placed at the vanishing point 406. The following variables can be defined:

$$W_u = U_x - x_e; w_d = x_c - D_x \quad (11)$$

Using the similarity of triangles UVF and CVD, where points U, F, C, and D are depicted in FIGS. 8A and 8B, and where V represents the vanishing point 406 (not depicted in FIGS. 8A and 8B due to scale), the similarity coefficient r and values $w_u$ and $w_d$ may be obtained as follows:

$$r = \frac{|UF|}{|CD|} = \frac{y_d y_u + (y_d x_e - y_u x_c)c - x_c x_e c^2}{y_d^2 - x_c^2 c^2} \quad (12)$$

$$w_u = \frac{1}{1 - c^2}[(x_c + y_d c)r - (x_e + y_u c)] \quad (13)$$

$$w_d = \frac{1}{1 - c^2}\left[(x_c + y_d c) - (x_e + y_u c)\frac{1}{r}\right] \quad (14)$$

$$U_x = x_e + w_u; U_y = y_u \quad (15)$$

$$D_x = x_c - w_d; D_y = y_d \quad (16)$$

$$F_x = x_e; F_y; y_u = w_u c \quad (17)$$

$$C_x = x_c; C_y = y_d + w_d c \quad (18)$$

where ($U_x$,$U_y$) are the coordinates of one of the head vertices 504a,b; ($F_x$,$F_y$) are the coordinates of the other of the head vertices 504a,b; ($C_x$,$C_y$) are the coordinates of one of the foot vertices 502a,b; and ($D_x$,$D_y$) are the coordinates of the other of the foot vertices 502a,b. The video analytics module 224 may accordingly evaluate Equations (15)-(18) to determine the coordinates of the foot vertices 502a,b and head vertices 504a,b of the NR and PL trapezoids 410.

For the NL and PR trapezoids 410 of FIGS. 9A and 9B, using the same definitions for U, D, C, and F as for FIGS. 8A and 8B, results in the following:

$$U_x = x_e; U_y = y_u \quad (19)$$

$$D_x = x_c; D_y = y_d \quad (20)$$

$$C_x = \frac{y_u - x_e c}{y_d - c x_c} x_c; C_y = \frac{y_u - x_e c}{y_d - x_c c} y_d \quad (21)$$

$$F_x = \frac{y_d - x_c c}{y_u - c x_e} x_e; F_y = \frac{y_d - x_c c}{y_u - x_e c} y_u \quad (22)$$

The video analytics module 224 may accordingly evaluate Equations (19)-(22) to determine the coordinates of the foot vertices 502a,b and head vertices 504a,b of the NL and PR trapezoids 410.

For the NM and PM trapezoids 410, the notations of FIGS. 10A and 10B are used. For both trapezoids 410, the higher one of the head vertices 504a,b is denoted as U, and the lower one of the foot vertices 502a,b is denoted as D. For both trapezoids 410, the vertical coordinates of the top and bottom sides of the bounding box 408 are denoted as $y_u$ and $y_d$. For the NM trapezoid 410 of FIG. 10A, the left foot vertex 502a is denoted as C, and the right head vertex 502b is denoted as F; and the horizontal coordinate of the bounding box's 408 left side is $x_c$, and the horizontal coordinate of the bounding box's 408 right side is $x_e$. For the PM trapezoid of FIG. 10B, the left head vertex 504a is denoted as F, and the right foot vertex 502b is denoted as C; and the horizontal coordinate of the bounding box's 408 left side is $x_e$, and the horizontal coordinate of the bounding box's 408 right side is $x_c$. This notation results in the following:

$$U_x = x_c; U_y = y_u \quad (23)$$

$$D_x = \frac{y_d x_e}{y_u + (x_e - x_c)c}; D_y = y_d \quad (24)$$

$$C_x = \frac{y_d x_c}{y_u + (x_e - x_c)c}; C_y = \frac{y_u y_d}{y_u + (x_e - x_c)c} \quad (25)$$

$$F_x = x_e; F_y = y_u + (x_e - x_c)c \quad (26)$$

The video analytics module 224 may accordingly evaluate Equations (23)-(26) to determine the coordinates of the foot vertices 502a,b and head vertices 504a,b of the NM and PM trapezoids 410.

Cost Function Determination

The length parameters in Equations (1)-(26) are contemplated in metric units. To apply a homology mapping to points in an image, distance in pixels is in at least some example embodiments converted to metric units. The scaling factors that the video analytics module 224 applies for this conversion are (horizontal image resolution)/(sensor width, $W_{sen}$) (for the horizontal conversions), and (vertical image resolution)/(sensor height, $h_{sen}$) (for vertical conversions). During conversion, the video analytics module 224 also takes into account any differences between the image and pixel coordinate systems. For example, the image coordinate system may have its origin in the center of the image, with the vertical axis extending positively towards the top edge of the image and the horizontal axis extending positively towards the right edge of the image. In contrast, the pixel coordinate system may have its origin in the top, left corner of the image, with the vertical axis extending positively towards the bottom edge of the image and the horizontal axis extending positively towards the right edge of the image. For simplicity of mathematical expressions the scaling and translation of coordinates described above are not incorporated in the mathematical formulas presented herein.

To determine the cost function for the optimization problem, the video analytics module 224 applies the homology transformation (Equations (7) and (8)) to the foot vertices (vertices 502a,b in FIG. 5A; points C and D in FIGS. 8A, 8B, 10A, and 10B; or points F and D in FIGS. 9A and 9B).

The resulting projections, which are the head vertex estimates 506a,b, do not coincide with the actual head vertices 504a,b. Part of the discrepancy is due to various reasons discussed above, while part of the discrepancy results from inaccuracy in the camera parameters used in calculations in block 1604, 1605 and 1606 of FIG. 16. By reducing and, in at least one example embodiment minimizing, the distance between the head vertex estimates 506a,b and actual head vertices 504a,b, the video analytics module 224 can accordingly obtain better estimates of the camera parameters. Experimentally, and as described further below, it has been determined that the accuracy of these estimates is surprisingly good. In at least one example embodiment the video analytics module 224 uses the sum of squares of normalized distances $d_1$ and $d_2$ as shown in FIG. 5 for all available bounding boxes 408. Implicitly, this cost function is a function of the following camera parameters: orientation angles (tilt and roll), camera height, and focal length. An example cost function follows:

$$E = \frac{1}{2n}\sum_{i=1}^{n}\left(\frac{d_{1,i}^2}{h_{1,i}^2} + \frac{d_{2,i}^2}{h_{2,i}^2}\right) \tag{27}$$

where E is error or cost function, i represents a particular bounding box 408 of the input data sample, $d_1$ and $d_2$ are as shown in FIG. 5, $h_1$ is the distance between the first foot vertex 502a and the first head vertex 504a, and $h_2$ is the distance between the second foot vertex 502b and the second head vertex 504b.

Another option for the cost function is $$E = \frac{1}{2n}\sum_{i=1}^{n}\left(\frac{|d_{1,i}|}{h_{1,i}} + \frac{|d_{2,i}|}{h_{2,i}}\right) \tag{28}$$

The cost function of Equation (28) can be interpreted as relative error for person height prediction minimization, which is one of the primary goals of camera calibration. The error (Equations (27) and (28)) is averaged over vertical edges and bounding boxes 408.

Experimentally, experiments show that the results obtained using cost functions of Equations (27) and (28) are very similar.

Numerical Optimization Implementation in the 2D Model

The errors, either determined using Equation (27) or (28) or similar equations, are calculated using the calculation graph 1611 of FIG. 16. Because of significant noise in the data due to imperfect detection, person height variety, and model error dependence on person pose, the error is averaged over a large number of bounding boxes 408: the accuracy is increased with the number of bounding boxes 408 used for averaging. Accordingly, efficiently using computational resources is an issue for at least two reasons, particularly when implementing automatic camera calibration on embedded devices such as the cameras 108 or in other environments with limited computational resources. First, the automatic calibration method 1500 stores a large number of bounding boxes 408 in memory, which is limited. Second, the method 1500 uses a large amount of processing power to iterate on a large data set. In some example embodiments, these problems are addressed by implementing camera calibration offline on a server (e.g., the workstation 156) after accumulating a sufficient amount of data, and then uploading the camera parameters after they have been determined to an embedded device such as the camera 108.

To avoid the complications in implementation described above, derivative based optimization methods may be used. These methods allow for calculating partial derivatives of the error with respect to all optimization parameters and applying the derivatives for updating the optimization parameters. This can be done by applying mini-batch or stochastic gradient decent optimization, which allow for running computations for a small set of bounding boxes 408 (including a single bounding box 408) in each optimization step.

The complexity involved with implementing the 2D and 3D models differs (the implementation of the 3D model is discussed below). In the 2D model it is possible to write down an expression for the error (Equations (27) or (28)) as a function of optimization parameters in a closed form. This allows for deriving expressions for partial derivatives of the error with respect to each optimization parameter. The expression for the error and its partial derivatives with respect to each optimization parameter can be used in implementing a numerical optimization procedure for camera calibration. Obtaining these expressions is cumbersome and may require symbolic calculation software libraries. Fortunately, it is much more efficient to implement the error calculation as a step-by-step forward propagation as depicted in the computational graph 1611 of FIG. 16 by solid line arrows. It is also possible to use a backpropagation procedure by reversing this same graph 1611 for calculating the partial derivatives of the error functions with respect to the optimization parameters. The backpropagation flow is shown in FIG. 16 as dashed line arrows. The computational graph 1611 in FIG. 16 describes only major groups of computational steps and for clarity omits operations used in forward and backward propagation that are known to a person of ordinary skill in the art. Some mathematical details are discussed further below.

3D Model: Determining Projections 416 of Parallelepiped Vertices

The calculations involved in projecting vertices of the parallelepiped 305 to the image (block 1503 in FIG. 15 and block 1608 in FIG. 16) are more complex for the 3D model than the analogous calculations for projecting vertices of the rectangle 304 are for the 2D model. For the 3D model, four main configurations of bounding box 408, vanishing point 406 and horizon line 402 combinations are considered: all bounding box 408 edges are located to the right or to the left of the vanishing point 406, and horizon line 402 slope is either negative or positive. For the sake of simplicity, the two configurations in which the vanishing point's 406 x coordinate is located between the bounding box's 408 vertical edges for any horizon line 402 slope are not discussed herein; these configurations in practice cover only a very small proportion of bounding boxes 408 detected when the system 100 is in use. For simplicity only two of these four configurations are discussed in detail herein: the configurations in which the bounding box 408 is located to the right of the vanishing point 406, and the horizon line 402 has either positive or negative slope. Similar to the 2D model, the configurations in which the bounding box 408 is located to the left of the vanishing point 406 are symmetrical and the formulas obtained below for the configuration in which the bounding box 408 is located to the left of the vanishing point 406 are applicable for the configuration in which the bounding box 408 is located to the right of the vanishing point 406.

The configuration in which the bounding box 408 is located to the right of the vanishing point 406 with negative horizon line 402 slope is shown in FIG. 18. Contrary to the 2D model, for the 3D model the locations of the bounding box 408, the vanishing point 406, and the horizon line 402 (block 1603 in FIG. 16) are not sufficient for determining the location of vertices A, B, C, D, E, F, G, and H. It is possible, however, to choose the x coordinate of vertex A as a parameter and find the coordinates of the rest of the vertices as a function of this parameter. The following geometrical properties of the parallelepiped projection 416 can be used: edges (AB), (GH), (DC), and (EF) are parallel to the horizon line 402; lines passing through edges (EG), (BD), (AC), and (FH) intersect the vanishing point 406; and lines passing through edges (AH), (BG), (DE), and (CF) intersect at point P on the horizon line 402, which is at the intersection of the horizon line 402 with a line 1802 perpendicular to the horizon line 402 passing through the vanishing point 406.

The coordinates of all vertices of the projection 416 of the parallelepiped 305 can be expressed in terms of one parameter: the x coordinate of vertex A. As with the 2D model, to simplify all mathematical expressions below, the center of the image coordinate system is placed at the vanishing point 406. For convenience, the coordinates of vertex A are written as $$x_A = x_r - s; y_A = y_a \quad (29)$$

where s is the parameter in terms of which the coordinates of all vertices A-H of the projection 416 can be expressed.

Thus, vertex C can be determined from vertex A as $$x_C = x_r; y_C = \frac{x_r}{x_A} y_d \quad (30)$$

The coordinates of the vertex E can be written as $$x_E = x_1 + p; y_E = y_u \quad (31)$$

where p is another parameter. Parameter p can be expressed using parameter s.

The coordinates of Vertex G can be determined from the coordinates of vertex E as $$x_G = x_1; y_G = \frac{x_1}{x_E} y_u \quad (32)$$

The coordinates of vertex F can be determined from the coordinates of vertices E and C as $$x_F = \frac{(y_C - y_p)x_p + (y_u - cy_E - y_p)(x_C - x_p)}{y_C - y_p - c(x_C - x_p)}; \quad (33)$$

$$y_F = y_u + c(x_F - x_E)$$

where $x_p$ and $y_p$ are the coordinates of point P.

The coordinates of vertex B can be determined from the coordinates of vertices A and G as $$x_B = \frac{x_h(y_G - y_p) + (y_d - y_p - cx_A)}{y_G - y_H - c(x_C - x_p)}; \quad (34)$$

$$y_B = y_d + c(x_B - x_A)$$

The coordinates of vertex D can be determined from the coordinates of vertices E and C as $$x_D = \frac{x_h(y_u - y_p) + (y_C - y_p - cx_r)(x_E - x_p)}{y_u - y_H - c(x_E - x_p)}; \quad (35)$$

$$y_D = y_C + c(x_D - x_r)$$

The coordinates of vertex H can be determined from the coordinates of any two of vertices A, G, and F. For example, from the coordinates of vertices G and F, the coordinates of vertex H can be determined as $$x_H = \frac{(y_G - cx_l)x_F}{y_F - cx_F}; y_H = \frac{(y_G - cx_l)y_F}{y_F - cx_F} \quad (36)$$

The equation that expresses parameter s as a function of parameter p can be found from the fact that vertices B and D lie on a line passing through the vanishing point 406:

$$\frac{y_B}{x_B} = \frac{y_D}{x_D} \quad (37)$$

Equation (37) is a quadratic equation for the parameter p. The positive solution of that equation can be written as $$p(s) = \frac{s(cy_u x_r - cy_p x_r + y_p y_u - y_u^2)}{cx_p s + cy_d x_l - cy_p x_l - sy_u - y_d^2 + y_d y_p + sy_p - sy_d} \quad (38)$$

Similar calculations can be done for the configuration of the bounding box 408 located to the right of the vanishing point 406 with positive horizon line 402 slope shown in FIG. 19. The following geometrical properties of the parallelepiped projection 416 can be used for this configuration: edges (BA), (GH), (EF), and (DC) are parallel to the horizon line 402; lines passing through edges (GE), (BD), (CA), and (FH) intersect at the vanishing point 406; and lines passing through edges (GB), (ED), (FC), and (AH) intersect at point P.

The calculations for this configuration depicted in FIG. 19 are analogous to those performed in respect of FIG. 18, above. The coordinates of vertices B, F, E, A, and D can be determined from the coordinates of vertices G and C. Then, the coordinates of vertex H allow the y coordinate of vertex C to be expressed in terms of the y coordinate of vertex G. Finally, similar to the configuration depicted in FIG. 18, coordinates of all vertices can be expressed in terms of one parameter: the y coordinate of vertex G.

For convenience, the coordinates of vertex G are written as $$x_G = x_r; y_G = y_b + s \qquad (39)$$

where s is the parameter in terms of which the coordinates of all vertices of the projection 416 can be expressed. As with the configuration in which the horizon line 402 has a negative slope, the center of the image coordinate system is placed at the vanishing point 406.

Below, the expressions for all vertices are determined in a manner analogous to that described for FIG. 18, above.

The coordinates of vertex B can be determined from the coordinates of vertex G as $$x_B = x_p + \frac{y_p - y_d}{y_p - y_G}(x_l - x_p); \; y_B = y_d \qquad (40)$$

The coordinates of vertex F can be determined from the coordinates of vertex C as $$x_C = x_r; \; y_C = y_u - p \qquad (41)$$

$$x_F = x_p + \frac{y_u - y_p}{y_C - y_p}(x_r - x_p); \; y_F = y_u \qquad (42)$$

where another parameter p is introduced.

The coordinates of vertex E can be determined from the coordinates of vertices G and F as $$x_E = \frac{y_u - cx_F}{y_G - x_l}x_l; \; y_E = \frac{y_u - cx_F}{y_G - x_l}y_G \qquad (43)$$

The coordinates of vertex D can be determined from the coordinates of any two of vertices B, C, and E. For example, from the coordinates of vertices E and B, the coordinates of vertex D can be determined as $$x_D = \frac{y_C - cx_r}{y_d - cx_B}x_B; \qquad (44)$$

$$y_D = \frac{y_C - cx_r}{y_d - cx_B}y_d$$

The coordinates of vertex A can be determined from the coordinates of vertices B and C as $$x_A = \frac{y_d - cx_B}{y_C - cx_r}x_r; \qquad (45)$$

$$y_A = \frac{y_d - cx_B}{y_C - cx_r}y_C$$

The coordinates of vertex H can be determined from the coordinates of any two of vertices G, A, F, and E. For example, from the coordinates of vertices G an F, the coordinates of vertex H can be determined as $$x_H = \frac{y_G - cx_l}{y_u - cx_F}x_F; \qquad (46)$$

$$y_H = \frac{y_G - cx_l}{y_u - cx_F}y_u$$

The equation that expresses parameter p as a function of parameter s can be obtained from the fact that line (AH) passes through point $P(x_p, y_r)$. This equation can be written as $$y_p = \frac{y_H - y_A}{x_H - x_A}(x_p - x_A) + y_A \qquad (47)$$

Equation (47) is a quadratic equation for parameter p. The positive solution of that equation is $$p(s) = \frac{sx_l(cx_l - cx_p - y_u + y_p)}{-cx_p s + cx_l s + cx_r s + cx_r x_p - cx_r^2 + sy_p + x_r y_d - x_r y_p} \qquad (48)$$

Thus, similar to the negative horizon line 402 slope configuration depicted in FIG. 18, the vertices depicted in FIG. 19 for the positive horizon line 402 slope configuration can be expressed as a function of one parameter, s.

For both negative and positive horizon line 402 slope configurations the parameter s that defines the location of all vertices of the projection 416 can be found from the equality of width and depth of the parallelepiped 305. To employ that constraint, vertices G, B, and A are mapped to the world coordinates using image-to-ground plane homography Equations (9) and (10) obtained in block 1606 of the computational graph 1611: $x_G, y_G \rightarrow X_G, Y_G$; $x_B, y_B \rightarrow X_B, Y_B$; $x_A, y_A \rightarrow X_A, Y_A$. The world coordinates of vertices A, B, and G are functions of the parameter s. Thus, the equation for s can be written as $$(X_A(s) - X_B(s))^2 + (Y_A(s) - Y_B(s))^2 = (X_G(s) - X_B(s))^2 + (Y_G(s) - Y_B(s))^2 \qquad (49)$$

Equation (49) does not have a closed form solution and should be solved numerically.

Figure 20:
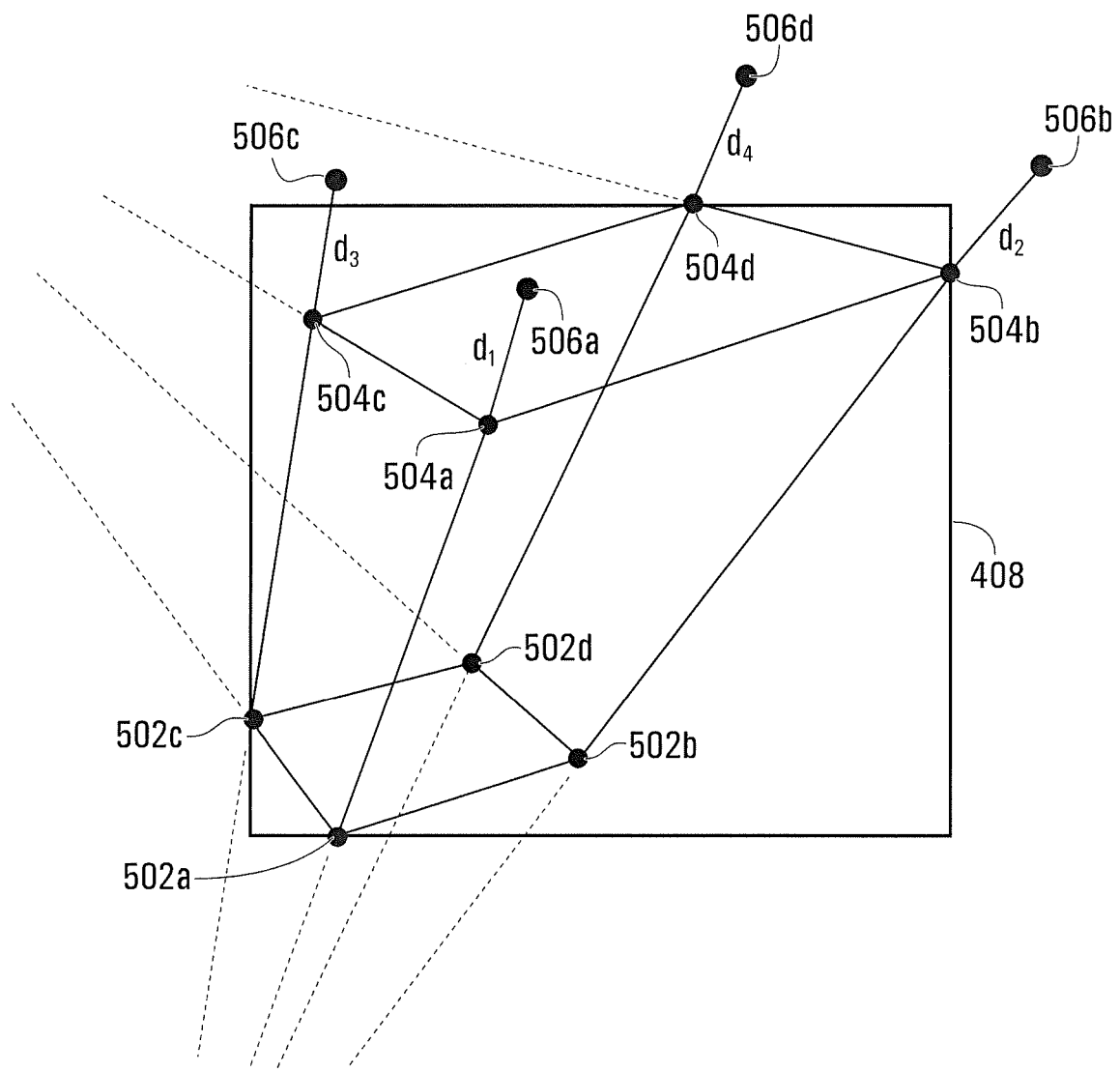
FIG. 20 depicts a projection of a parallelepiped within a bounding box, with head vertices, feet vertices, and head vertex estimates highlighted.

As depicted in FIG. 20, similar to the 2D model, in block 1606 of the computational graph 1611, head vertex estimates 506a,b,c,d are determined form the foot vertices 502a,b,c,d by using the feet-to-head homology (Equations (7) and (8)).

The error for the 3D model is defined based on the distances $d_1$, $d_2$, $d_3$, and $d_4$ depicted in FIG. 20 between the head vertices 504a,b,c,d obtained in block 1608 of the computational graph 1611 and the head vertices estimates 506a,b,c,d obtained in block 1609. The minimization cost function may be defined, as follows, in a manner similar to the 2D model cost function of Equation (27):

$$E = \frac{1}{4n}\sum_{i=1}^{n}\left(\frac{d_{1,i}^2}{h_{1,i}^2} + \frac{d_{2,i}^2}{h_{2,i}^2} + \frac{d_{3,i}^2}{h_{3,i}^2} + \frac{d_{4,i}^2}{h_{4,i}^2}\right) \qquad (50)$$

where i represents a particular bounding box 408 of the input data sample, $d_1$ to $d_4$ are as shown in FIG. 20, and $h_{1,i}$, $h_{2,i}$, $h_{3,i}$, $h_{4,i}$ are the distances between the foot vertices 504a,b,c,d and the head vertices 504a,b,c,d for bounding box 408 i, respectively.

Similar to the 2D model, the cost function can be also defined as the relative error for person height prediction averaged over vertical edges and bounding boxes 408 (c.f. (Equation (28)):

$$E = \frac{1}{4n}\sum_{i=1}^{n}\left(\frac{|d_{1,i}|}{h_{1,i}} + \frac{|d_{2,i}|}{h_{2,i}} + \frac{|d_{3,i}|}{h_{3,i}} + \frac{|d_{4,i}|}{h_{4,i}}\right) \quad (51)$$

Thus, the coordinates the head vertex estimates 506*a,b,c,d* in the 3D model can be determined by including an iterative procedure of solving Equation (49) in block 1608 of the computational graph 1611. That makes implementing the 3D model more computationally expensive than the 2D model and eliminates the opportunity to apply backpropagation for minimizing error determined in block 1610 of the computational graph 1611.

Linear Regression Model

Besides the 3D and 2D model approaches, a linear regression ("LR") model can be used for person height estimation. When applying the LR model, person height is modelled as a linear function of x and y image coordinates:

$$h(x,y) = ax + by + c \quad (52)$$

where x and y are image coordinates and a, b, and c are constants determined from person detections. In typical surveillance camera installation, the horizon line 402 is parallel to the x axis and the coefficient a in Equation (52) is small.

Although some mathematical justification of the LR model is discussed below, it is not clear how to strictly justify it mathematically. However, experimentally, the LR model nonetheless provides sufficient accuracy in many base cases. Therefore, the LR model is considered as a baseline.

Convergence, Stability, and Implementation Details

In at least some example embodiments, the unknown camera parameters comprise orientation angles (tilt and roll), camera height, and focal length. In at least some other example embodiments, different camera parameters may be known or unknown.

For example, in some example embodiments in which the zoom of the camera 108 can be controlled, the focal length may be known, and it can be excluded from the list of unknown parameters that are iteratively determined by reducing or minimizing of the cost function. The method for calibrating the camera 108 may accordingly be more accurate, robust against noise, and/or converge more quickly. Additionally or alternatively, in some example embodiments the camera 108 may comprise a gyroscopic sensor that can detect one or more orientation angles (tilt and roll). In those embodiments, those one or more known orientation angles may be excluded from the list of unknown parameters to further increase accuracy, robustness against noise, and/or convergence.

In embodiments in which certain camera parameters are known, the video analytics module 224 may solve the optimization problem once to determine values for the unknown camera parameters and subsequently avoid having to solve the optimization problem again when one or more of the known parameters changes. For example, if the focal length is known, the tilt, roll, and camera height may be estimated by the video analytics module 224 by solving the optimization problem. The homology transformation is a function of all known and estimated parameters. Once the camera zoom is changed and a new focal length value is available, the video analytics module 224 may simply use this new focal length value for the homology transformation and does not need to solve the optimization problem again. The situation is similar when orientation angles and focal length are known: the video analytics module 224 may solve the optimization problem once to find the camera height. After that, when the camera 108 is rotated and/or zoom is changed, the new value for the orientation angles and/or focal length can be used when performing the homology transformation.

Usually, the camera 108 is aligned such that the horizon line 402 is close to horizontal: the value of p is 180°+/−about 5°. In embodiments in which ρ=180°, c=0, the determinations the video analytics module 224 makes in order to arrive at the foot vertices 502*a,b* and head vertices 504*a,b* are simplified relative to those for the general case as discussed in respect of FIGS. 8A, 8B, 9A, 9B, 10A, and 10B above: all trapezoid vertices 502*a,b*, 504*a,b* lie in the top and bottom sides 414*a,b* of the bounding box 408. In this specific case, the convergence of the optimization may be faster, and the accuracy of the determined camera parameters may be better, than the general case. That allows the video analytics module 224 to divide the solving of the optimization problem into two parts. In the first part, the video analytics module 224 determines the solution for the special case of ρ=180°, c=0. In the second part, the solution obtained in part one is used as an initial guess for the general optimization problem. The second part improves the solution if the slope of the horizon line 402 is not, in fact, zero.

Practically, performing camera calibration according to at least some example embodiments comprises gathering a certain number of data samples in the form of bounding boxes 408 bounding persons 302; determining the cost function as a sum of a loss function for all data samples in order to estimate camera parameters; and then using those camera parameters in video analytics applications. Generally, the optimization problem is not convex and multiple local minima exist. However, experimentally it has been observed that given a sufficient number of bounding boxes 408 as input (e.g., 50), performing camera calibration according to at least some embodiments reliably converges to the correct solution.

In at least some example embodiments, random sample consensus (RANSAC) may be applied to input data samples to increase the quality of the data with which calibration is performed. Additionally or alternatively, a variety of optimization methods may be applied. For example, methods that require knowledge of derivatives, such as batch gradient decent, or that do not, such as the simplex method, may be used. In some embodiments it may be more convenient to solve the optimization problem using stochastic gradient decent or, more generally, mini-batch gradient decent. When the video analytics video analytics module 224 detects all objects in a single image, all detections or even a single detection may be used in one iteration of the gradient decent. Any suitable gradient decent method, such as Momentum, Adam, and RMSprop and learning rate changing strategies may be used. When applying gradient decent, the video analytics module 224 determines derivatives of the cost function with respect to unknown camera parameters. While the closed form solutions for these derivatives exist, it is not feasible to use them in calculations due to their enormous complexity. Consequently, the video analytics module 224 may instead build a computational graph for the loss function and use a back-propagation method to determine the derivatives. Applying mini-batch gradient decent methods can allow the video analytics module 224 to solve the optimization problem recursively: the video analytics module 224 updates the solution with every image frame, improving parameter accuracy each time the solution is updated. This approach permits the camera calibration method to be used for real-time applications.

Choosing Initial Guess Values for the 3D and 2D Models

For the 3D model, besides the initial values for the optimization parameters, the initial value for the parameter s is required for each bounding box 408. The initial values for s are selected so that the 3D model converges. The convergence can be achieved by performing the following steps. First, the 2D model solution is obtained. Then, optimization parameters obtained from the 2D model are used as an initial guess for the iterative solution of the 3D model. The initial values for parameter s can be obtained by the approximate solution of Equation (49) in the limit of small values of s (parameter s is small for a typical surveillance camera installation).

Experimentally, the 2D model has been shown to converge very robustly and regardless of the initial values of the camera parameters. However, to reach faster convergence, it is possible to use the solution for the LR model (Equation (52)) as the initial guess. The LR model does not contain any integrative procedures and therefore does not have any potential convergence problem. Below the steps for calculating the initial guess for the camera parameters from the LR model's solutions are described.

For a typical surveillance camera installation, $\rho \approx 180°$. In the case of $\rho = 180°$, Equations (7) and (8) for the feet-to-head homology can be written as the following system of equations:

$$\begin{pmatrix} x_h w \\ y_h w \\ w \end{pmatrix} = \begin{pmatrix} 1 & 0 & 0 \\ 0 & 1 - \frac{h_C}{h_H}(\sin\theta)^2 & -\frac{h_C}{h_H} f \sin\theta \cos\theta \\ 0 & -\frac{1}{f}\frac{h_C}{h_H}\sin\theta\cos\theta & 1 - \frac{h_C}{h_H}(\cos\theta)^2 \end{pmatrix} \begin{pmatrix} x_f \\ y_f \\ 1 \end{pmatrix} \quad (53)$$

where w is the homogeneous coordinate multiplier. The System of Equations (53) accordingly comprises a first equation for $x_h w$, a second equation for $y_h w$, and a third equation for w.

From the third equation of the System of Equations (53):

$$w = 1 - \frac{h_C}{h_H}\frac{y}{f}\sin\theta\cos\theta - \frac{h_C}{h_H}(\cos\theta)^2 \quad (54)$$

In many installations (especially outdoor installations) of surveillance cameras 108, $$\frac{h_C}{h_H} \lesssim < 2, \; \frac{y}{f} \lesssim 0.3$$

and $|\cos\theta| \leq 0.3$. The second approximate inequality means that the sensor's 116 size is comparable in size to or less than the focal length and most object detections are closer to the center of the image (y=0) than to the image's horizontal edges. The third approximate inequality means that tilt of the camera is not too far from the horizontal.

Thus, very often with accuracy of about 20%, $w \approx 1$. This approximation corresponds to $x_h \approx x_f$ (see the first equation of the System of Equations (53)).

If $y_h$ is written as the sum of $y_f$ and the person's 302 height in pixels h(y), with the same accuracy the following results from the second equation of the System of Equations (53) can be obtained:

$$h(y) = \frac{h_C}{h_H}(1 - 2(\sin\theta)^2)y - \frac{h_C}{h_H} f \sin\theta\cos\theta \quad (55)$$

The first term of Equation (55) is analogous to by and the second term to c in the LR approximation of Equation (52), while the coefficient a is equal to zero as expected for the approximation $\rho = 180°$. Thus, it can be expected that the LR solution has an accuracy of about 10% to 20% in most cases.

The video analytics video analytics module 224 may use the closed form LR solution to estimate $h_c$ and $\theta$, and those estimates may in turn be used as initial guesses when performing the method 1500:

$$\tan\theta = \frac{bf}{c} \quad (56)$$

$$h_c = -\frac{b}{(\sin\theta)^2} \quad (57)$$

Using Equations (56) and (57) as initial guesses together with $\rho = 180°$ may in at least some embodiments allow for faster convergence of the 2D and 3D models. More accurate analysis of Equations (53) and (54) can be done using a Taylor expansion for the "small" parameter $$\frac{h_C}{h_H}\frac{y}{f}\sin\theta\cos\theta.$$

However, the approximation of Equations (56) and (57) is sufficient in practice.

As mentioned above, in at least some embodiments the method 1500 may be used to reduce the false positive detection rate when the video analytics video analytics module 224 is attempting to detect persons 302. Once the camera 108 has been calibrated, it may obtain an image ("sample image") on which the video analytics module 224 has detected a person 302, as represented by a bounding box 408 ("sample bounding box 408"). The camera 108 may obtain the sample image by capturing the image itself. The video analytics module 224 then determines an estimated height of the person 302 using a bottom of the sample bounding box 408 and a mapping in the form of the homology matrix as determined using the camera parameters that are known prior to calibration and that are determined during calibration. The video analytics module 224 compares the estimated height to the presumed height of a person 302 and, when the estimated height and the presumed height differ by less than a minimum person height, the object is flagged as a person 302; otherwise, the detection is flagged as a false positive. The video analytics module 224 may determine whether the estimated height and the presumed height differ by less than a minimum person height in any suitable manner. For example, the video analytics module 224 may subtract one of the heights from the other, or determine whether the difference between the heights exceeds a certain percentage.

Experimental Results

Several experiments performed to evaluate the 2D and 3D models of the method 1500 are described below. In all experiments objects in the video were detected by the video analytics module 224 and bounding boxes 408 for each detection were generated.

In the first set of experiments, an Avigilon™ 3.0C-H3A-B01-IR bullet camera was used as the camera 108. The camera 108 was set up at a height of 2.94 m above the ground. For all experiments the roll angle was set up as $\rho \approx 180°$, the camera focal length was 4.01 mm, the sensor size was 5.12 mm×3.84 mm, and the video resolution was 2048×1536. The camera tilt and roll were measured with a consumer angle finder device with precision of ±0.1°. The height of the person 302 was about 1.7 m. The focal length of the camera 108 and the roll were assumed known. These experiments were conducted in an indoor environment where the ground surface was flat with good accuracy. The videos were processed by the video analytics module 224 using a single shot detector ("SSD") convolutional neural network.

The relative error of estimating camera parameters as well as the relative error of person height prediction were calculated. The former is important for an application like object tracking that may require transferring image coordinates to ground plane world coordinates, while the latter is important for filtering out false positives based on size. Relative person error prediction is calculated using Equations (27) and (28). To optimize for minimum person height prediction error, Equations (27) and (28) were used as cost functions for minimization. However, the cost functions in the form of Equations (27) and (28) give almost identical results.

While Equations (27) and (28) are used for comparing the 2D and 3D models herein, in practice, an error estimate may be used. Error may be estimated by calculating a feet-to-head homology projection of a point selected from the middle of the bottom side of the bounding box 408. If the object is of person height, this projected point should be close to the top of the bounding box 408. The person height error can be estimated as the difference in y-coordinates between the projected point and the actual top of the bounding box 408. Using error estimates allows skipping the calculation of rectangle or parallelepiped 304 vertices projections, and the error estimates are similar to the more precise errors calculated using Equation (27) or (28). Errors in the prediction of person height and camera parameters are presented in Table 1 for various tilt angles θ. For convenience of presentation, the tilt angles in Table 1 are measured from the horizontal.

TABLE 1

Errors in the prediction of person height and camera parameters

| Tilt angle | Height prediction error | | Camera height error | | Camera tilt angle error | |
|---|---|---|---|---|---|---|
| | 2D model | 3D model | 2D model | 3D model | 2D model | 3D model |
| 20.7° | 3% | 3% | 5% | 14% | 7% | 10% |
| 25.3° | 4% | 3% | 2% | 12% | 1% | 1% |
| 32.3° | 4% | 4% | 3% | 14% | 10% | 8% |
| 38.4° | 4% | 5% | 0.3% | 14% | 18% | 15% |
| 45.1° | 5% | 8% | 5% | 29% | 20% | 15% |

These experiments were repeated for virtual reality videos generated by the Unreal™ engine with the parameters identical to ones for experimenting involving real cameras. Because of the simple background for virtual reality videos the object detection was easier for the video analytics module 224 and bounding box 408 accuracy was higher. For that reason, the performance for virtual reality videos approaches the upper bound for accuracy that can be obtained when detecting objects in real videos. Furthermore, the virtual reality video experiments eliminate possible error in the known camera parameters: tilt, roll, height, and focal length. Prediction errors for virtual reality videos analogous to those summarized in Table 1 are presented below in Table 2.

TABLE 2

Errors in the prediction of person height and camera parameters for virtual reality videos

| Tilt angle | Height prediction error | | Camera height error | | Camera tilt angle error | |
|---|---|---|---|---|---|---|
| | 2D model | 3D model | 2D model | 3D model | 2D model | 3D model |
| 20.7° | 2% | 2% | 4% | 4% | 4% | 1% |
| 25.3° | 2% | 3% | 3% | 7% | 3% | 1% |
| 32.3° | 2% | 3% | 4% | 3% | 5% | 3% |
| 38.4° | 3% | 5% | 9% | 4% | 9% | 3% |
| 45.1° | 4% | 8% | 12% | 2% | 15% | 10% |

The accuracy of both the 2D and 3D models is sufficient for practical applications. The accuracy of both models decreases when the tilt angle increases. However, accuracy remains sufficient for the tilt angle interval that is typical for surveillance cameras. The comparison of the 2D and 3D models results does not suggest that the 3D model performs better than the 2D one as one may expect: the difference in the models affects the error much less than the noise in the data used as input for the models.

In the next set of experiments, camera roll was treated as an unknown camera parameter. The results obtained for the 2D and 3D models for person height prediction, tilt prediction, and camera height prediction were almost identical to results reported above, while the roll angle was within 10°-20° of the horizontal.

In the last set of experiments, roll and focal length were treated as unknown camera parameters. The results obtained for the 2D model for person height prediction were very similar to the case when focal length is known. However, accuracy in estimating camera tilt and focal length can go up to 50% for some values of tilt. The accuracy for virtual reality data is better than for real video data.

The conclusions from these sets of experiments are the following. Both the 2D and 3D models can be used to predict person height and camera parameters (tilt, roll, and height) with sufficient accuracy regardless of whether focal length is a known or unknown parameter. Accuracy is, however, nonetheless higher when the focal length is a known rather than an unknown parameter.

In the next set of experiments a consumer camera, a Sony™ ILCE 6000L camera with a 16 mm focal length lens was used as the camera 108. The camera 108 was mounted at a height $h_c \approx 7.37$ m from the ground. The tilt and roll values measured by a consumer angle finder device were $\theta \approx 20.70°$ and $\rho \approx 180.50°$, respectively. The focal length was assumed to be known (f=16 mm), while the camera height, tilt, and roll were unknown (optimization) parameters. These experiments were conducted in an outdoor environment where the ground surface had visually noticeable deviations from the horizontal plane. Height predication errors for the 2D and 3D models were 3% and 8%, respectively. The errors in estimation of camera parameters are summarized in Table 3, below. These results support the conclusions from the experiments described above that implementations of both the 2D and 3D models achieve acceptable accuracy for typical security camera installations.

TABLE 3

Experimental results using a Sony ™ ILCE 6000L camera with a 16 mm focal length lens

|  | Camera height | Tilt angle | Roll angle |
|---|---|---|---|
| Measured values | 7.37 m | 20.7° | 180.5° |
| 2D Model | 7.06 m | 19.3° | 180.03° |
| 3D Model | 7.54 m | 18.8° | 180.07° |

The experiments described above do not provide evidence that the 3D model practically outperforms the 2D model for typical surveillance camera installations. As discussed above, the 2D model is more suitable for implementation in environments with limited computational resources. The next set of experiments is focused on comparing performance of the 2D model with the LR model (Equation (52)).

Three camera calibration methods were compared: the LR model and two versions of the 2D model. In the first version of the 2D model, the roll angle $\rho$ was unknown and calculated as the solution of the optimization problem. In the second version of the 2D model, the roll angle was assumed to be known: $\rho=180°$ (the slope c of the horizon line 402 was equal to 0). This second version was considered an alternate and is hereinafter interchangeably referred to herein as the "2DA model". Various experiments were run in which focal length is known and unknown. As above, the experiments in which the focal length was known resulted in improved calibration accuracy.

The error for the LR model was defined straightforwardly: relative error for predicted person height. For the 2DA and 2D models, error was defined as the relative deviation of the head vertex estimates 506$a,b$ from the actual head vertices 504$a,b$: distances $d_1$ and $d_2$ divided by the respective lengths of the left and right sides of the trapezoid 410, as shown in FIG. 5.

The accuracy of the LR, 2D, and 2DA models varied from case to case depending on the amount of input data, data noise, and where the bounding boxes 408 were located. Statistically the 2D and 2DA models outperformed the LR model by a large margin, and the 2D model outperformed the 2DA model.

For a large amount of input data in the form of bounding boxes 408 uniformly distributed across the camera's 108 field of view and for $\rho=180°$, the performance of all three models was similar in many cases. The advantage of homology-based methods was diminished by the noise in the data and uncertainty in person height. If p deviated from 180° the advantage of the homology-based methods was more pronounced. However, when the deviation was small, such as only a few degrees, the performance of all three models was close given a large amount of uniformly distributed data.

In practice, however, observed detections (bounding boxes 408) rarely covered the whole field of view of the camera 108, or even a large percentage of the field of view. For example, often it was observed that detections occurred only in relatively small areas of the field of view, such as pathways.

In the next set of experiments, the mathematical projections of rectangles 304 that model the person 302 were used as a dataset. The goal of these experiments was to investigate the effect of LR model degradation in the case of an object moving in a straight line in the world coordinate system. These experiments model calibrating cameras that detect pedestrians moving along a narrow pathway. The following camera parameters were used: f=35 mm, $\theta=110°$, $\rho=185°$, $h_H=1.76$ m, and $h_C=4$ m. Of these, $h_H$ was a known parameter, and the remaining parameters were unknown parameters. The experiments showed that in the cases when the rectangles 304 lie on a line and the LR model degraded, the 2D model still provided exact predictions.

Figure 11:
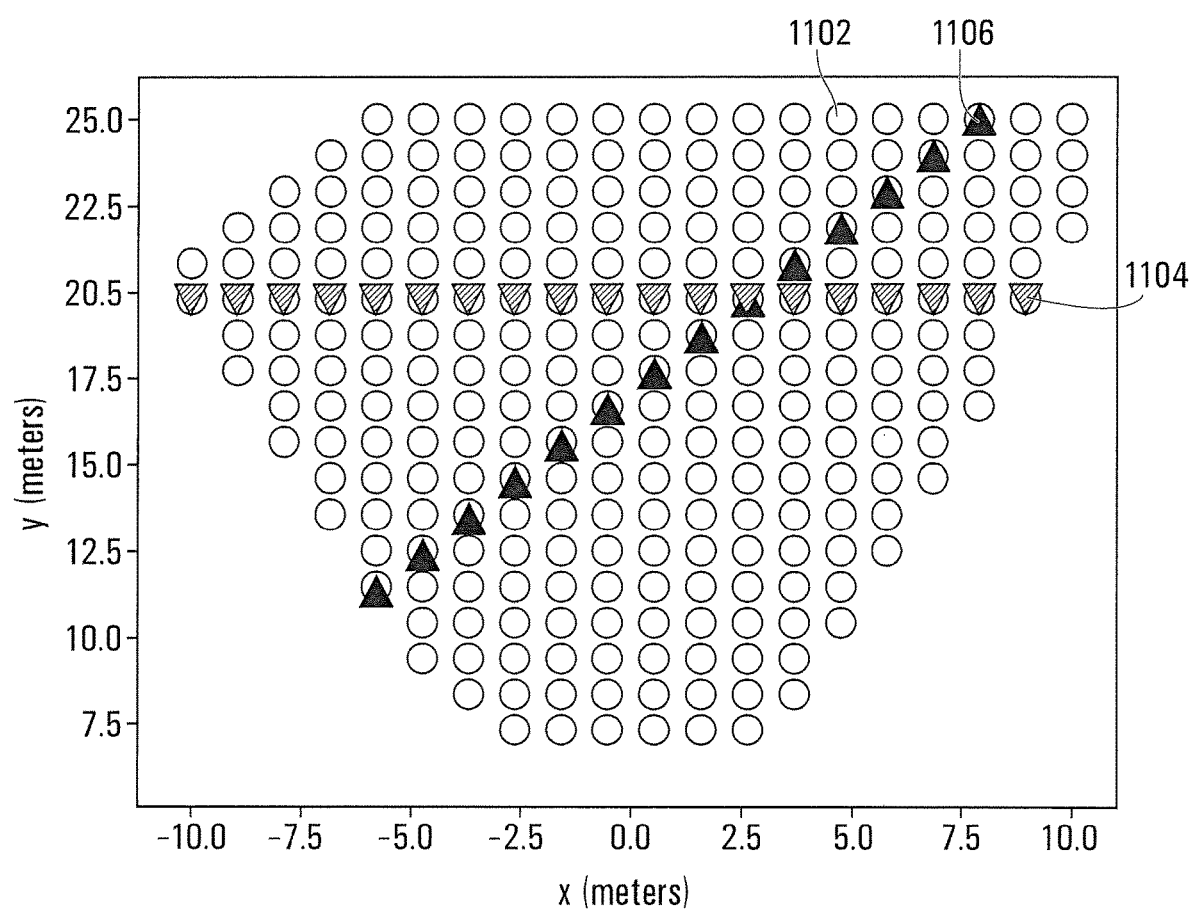
FIG. 11 depicts a graph depicting bounding box locations for experiments done to compare error rates of two example embodiments to a conventional linear regression method.

FIG. 11 and Table 4, below, summarize the results of the experiments with calibration based on mathematical projections of rectangles 304. FIG. 11 shows the distribution of data samples in the form of bounding boxes 408 in the image plane. In Experiment A, the bounding boxes 408 were uniformly distributed throughout a large portion of the image plane; the locations of the bounding boxes 408 for Experiment A are denoted using circles 1102. In Experiment B, the bounding boxes 408 were uniformly distributed along a line at y=20.0 m; the locations of the bounding boxes 408 for Experiment B are denoted using downwardly pointing triangles 1104. In Experiment C, the bounding boxes 408 were uniformly distributed along a diagonally extending line; the locations of the bounding boxes 408 for Experiment C are denoted using upwardly pointing triangles 1106. In Experiments A-C below the person height error was calculated in a simplified manner as described above: the middle point of the bottom side of the bounding box 408 has projected using the feet-to-head homology $H_{fh}$ (Equations (7) and (8)), then the difference in y-coordinates for the projection and the top of the bounding box 408 was measured. The difference in y-coordinates was normalized by the height of the bounding box 408 and treated as the error.

Figure 12A:
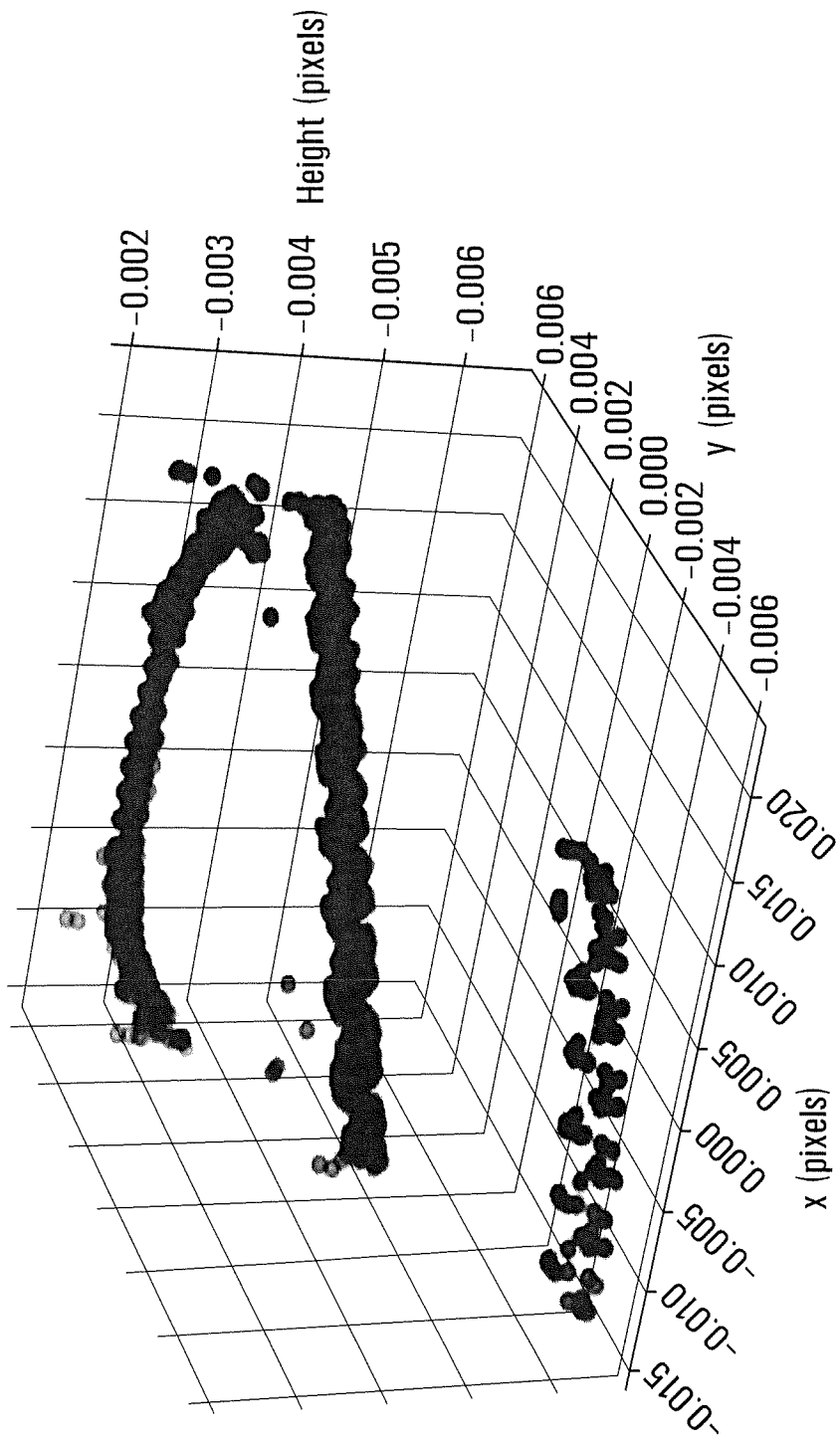
FIGS. 12A and 12B depict bounding box positions for two experiments done to compare error rates of an example embodiment to a conventional linear regression method.
Figure 12B:
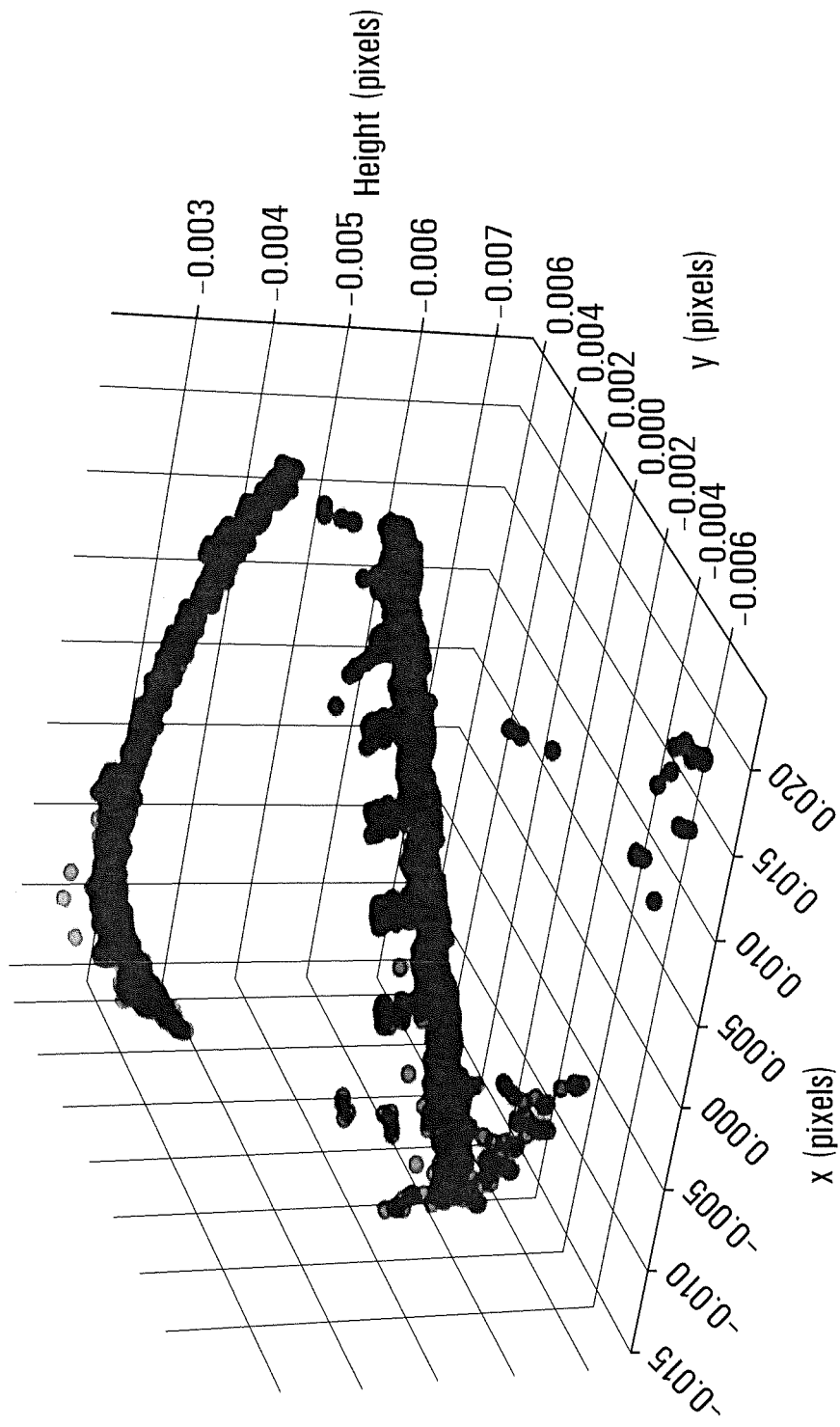

Table 5 shows calibration error for three videos for various sizes of training data sets. For the synthetic videos, the camera's 108 focal length was 22 mm and camera height was 4 m. For the video generated using the Avigilon™ camera, sensor size was 4.92 mm (width)×3.69 mm (height), focal length was 3 mm, and camera height was 2.45 m. FIGS. 12A and 12B depict bounding box 408 position within the camera's 108 field of view for the first and second synthetic videos, respectively.

TABLE 5

Calibration Error for Three Videos for Different Training Data Set Sizes

| Number of detections | UNREAL ™ Synthetic video 1 (1908 detections) | | UNREAL ™ Synthetic video 2 (1681 detections) | | 3.0C-H3A-B01-IR Avigilon ™ camera video (1558 detections) | | |
|---|---|---|---|---|---|---|---|
| N | LR | 2D | LR | 2D | LR | 2D | 2DA |
| 40 | 0.20 | 0.07 | 0.19 | 0.07 | 0.24 | 0.08 | 0.13 |
| 60 | 0.17 | 0.05 | 0.14 | 0.05 | 0.19 | 0.08 | 0.09 |
| 80 | 0.14 | 0.03 | 0.10 | 0.04 | 0.17 | 0.07 | 0.08 |
| 100 | 0.12 | 0.03 | 0.08 | 0.04 | 0.12 | 0.07 | 0.08 |
| All data | 0.02 | 0.02 | 0.02 | 0.02 | 0.05 | 0.04 | 0.04 |

TABLE 4

Summary of Results for LR Model Degradation Experiments

| Experiment | LR Model Error |
|---|---|
| A | 1% |
| B | 65% |
| C | 58% |

Table 4 indicates that the LR model had reasonable performance when data was uniformly distributed in the ground plane. When the data samples were on a line, the LR model's performance degraded significantly as the plane that approximated person height could not be defined by a line. At the same time, the error of the 2D method for these cases remained zero.

For all experiments, the error was defined as the relative deviation of the predicted person height from the bounding box 408 height averaged over all data sets (training or testing).

For additional experiments performed to test the method 1500 several datasets were used to compare the 2D model to a LR model. The video analytics module 224 was applied to this data to generate bounding boxes 408. Video from various sources was used: synthetic videos generated by the Unreal Engine™; indoor and outdoor videos captured by a consumer grade Sony™ ILCE 6000L™ camera; and videos generated by Avigilon™ cameras (H3A bullet camera (3.0C-H3A-B01-IR), and H4A bullet cameras (5.0C-H4A-B01-IR and 8.0C-H4A-B01-IR)).

In this set of experiments, the video analytics module 224 used as input data detections represented by bounding boxes 408 produced by a real-time object detection method based on the Google™ MobileNet SSD detection network. In the second series of experiments the effect of the amount of data on the accuracy of camera calibration was investigated. In the test videos, all detections covered a large portion of the camera's 108 field of view. In order to model scenarios in which object detections are confined to limited portions of the camera's 108 field of view, bounding boxes 408 that were confined to a limited area were selected for use in calibration.

In the videos that were used, one or two persons 302 were walking within the camera's 108 field of view; this allowed for modeling the effect of the data available from a limited area by using only a predefined amount of data from subsequent frames: trajectories of persons in a small number of subsequent frames were limited in the space in the camera's 108 field of view by mostly one or two narrow bands. In the experiments reported in Table 5, data sets of several sizes N were used (see the leftmost column of Table 5). For each data set, multiple experiments were performed by applying a sliding window with a stride equal to half of that dataset's size (N/2). The errors for all data sets of the same size N were then averaged. The smaller N corresponds to the modelling calibration for the human trajectories limited to the smaller area.

The camera 108 for the synthetic videos had a roll of 180°. Therefore, the 2DA model's results were very close to the 2D model's results and are not reported in Table 5.

Generally speaking, Table 5 shows that the fewer data points that were used, the more the 2D (generally) and 2DA (for)ρ=180° models outperformed the LR model. The lower limit of the error was reached when calibration was performed using all available data (the last row in Table 5). The 2D and 2DA models converged much more quickly to the lower error limit than the LR model.

Figure 13:
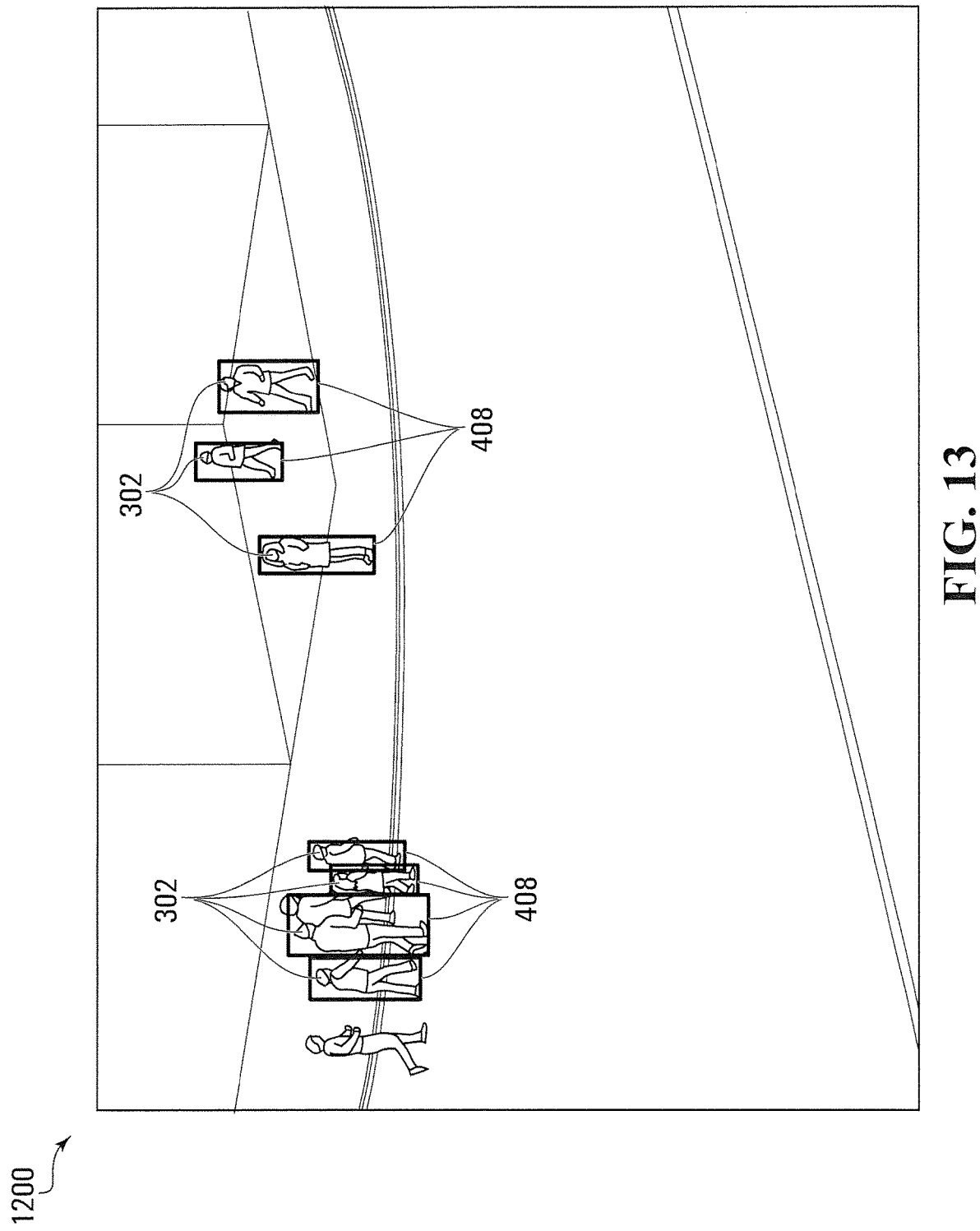
FIG. 13 depicts a sample image used as part of experiments done to compare error rates of two example embodiments to a conventional linear regression method.
Figure 14A:
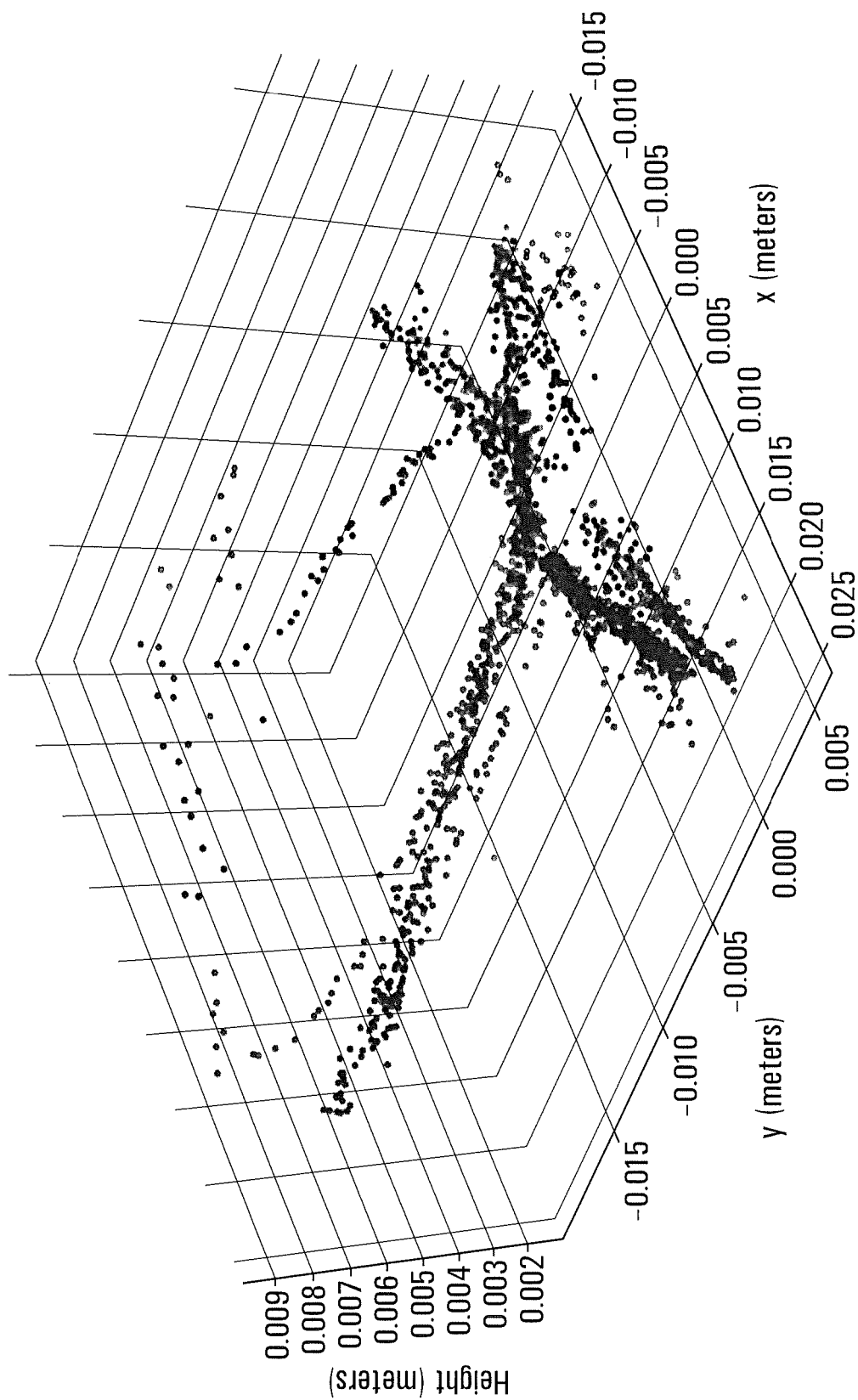
FIGS. 14A and 14B depict bounding box positions for training and testing data used in conjunction with the experiments related to FIG. 13A.
Figure 14B:
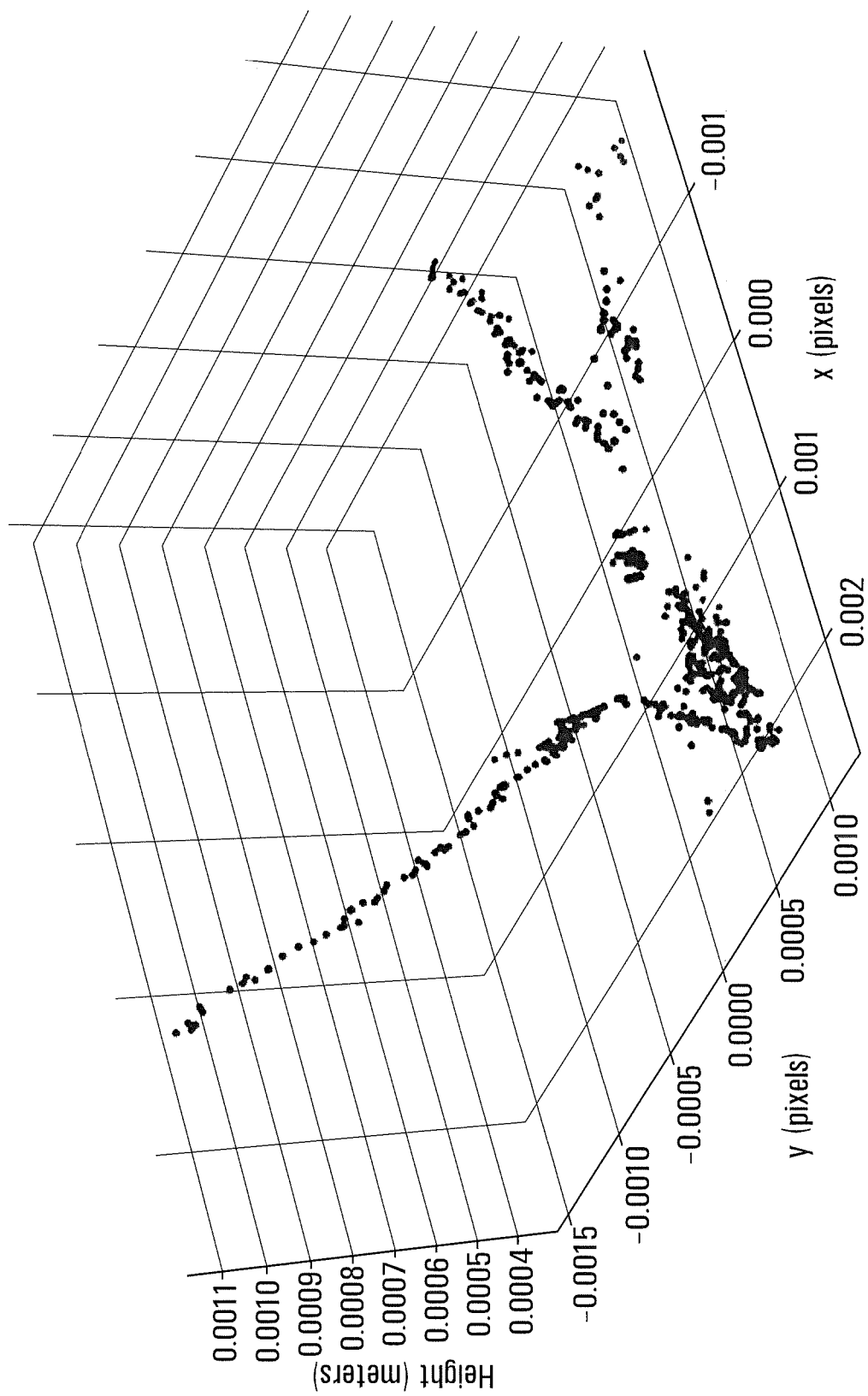

The next set of experiments used images captured using an Avigilon™ 5.0C-H4A-B01-IR camera. A sample image 1200 from the camera 108 is depicted in FIG. 13, which shows multiple bounding boxes 408 that bound detected persons 302. The LR, 2D, and 2DA models were trained using 100 detections each derived from subsequent image frames of the video, which contained 5,758 total available detections. FIG. 14A depicts the bounding box 408 locations comprising all these detections. The LR, 2D, and 2DA models were tested using a test data set of size 947 detections, the locations for which are depicted in FIG. 14B. As with the second set of experiments, the error for all methods was averaged. The 2D method error was 0.07 while the LR method was 0.35. The relatively poor performance of the LR method resulted from the fact that persons mostly move along a pedestrian pathway near the top of the image 1200, resulting in most detections being confined to a narrow band of the image 1200.

While in the depicted example embodiments multiple respective distances between head vertices 504*a,b* (for the rectangle 304) and 504*a,b,c,d* (for the parallelepiped 305) and head vertex estimates 506*a,b* (for the rectangle 304) and 506*a,b,c,d* (for the parallelepiped 305) are used, in at least some example embodiments only a single distance between a single head vertex 504 and a single head vertex estimate 506 may be used iteratively reducing the objective function.

It is contemplated that any part of any aspect or embodiment discussed in this specification can be implemented or combined with any part of any other aspect or embodiment discussed in this specification.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A method comprising:
obtaining one or more calibration images captured using a camera, the one or more calibration images comprising one or more bounding boxes of which each bounds a person;
for each of the bounding boxes, determining:
from tilt, roll, and focal length of the camera, a vanishing point and a horizon line of the calibration image;
using the vanishing point and the horizon line, a projection of the person bounded by the bounding box;
using the vanishing point, the horizon line, a height of the camera, and a presumed height of the person, a mapping that maps foot vertices of the projection to head vertices of the projection; and
using at least one of the foot vertices and the mapping, at least one estimate of the head vertices and at least one distance between at least one of the head vertices and the at least one estimate; and
calibrating the camera by iteratively updating, using an objective function and the at least one of the distances for each of the one or more bounding boxes, at least one of the tilt, roll, focal length, and height of the camera.

2. The method of claim 1, wherein the projection is a trapezoid that is projected from a rectangle that bounds the person.

3. The method of claim 2, wherein a height of the rectangle is the presumed height of the person.

4. The method of claim 2, wherein, using a Cartesian coordinate system, the camera is located at X=Y=0 and the rectangle is parallel to coordinate plane (X,Z).

5. The method of claim 2, wherein top and bottom sides of the trapezoid are parallel to the horizon line.

6. The method of claim 1, further comprising, after the camera has been calibrated:
obtaining a sample image captured using the camera, wherein the sample image comprises a sample bounding box that bounds an object;
determining an estimated height of the object using a bottom of the sample bounding box and the mapping;
comparing the estimated height to the presumed height; and
when the estimated height and the presumed height differ by less than a minimum person height, flagging the object as a person.

7. The method of claim 1, wherein, for at least one of the calibration images, the focal length is known prior to calibration and is excluded from the updating.

8. The method of claim 1, wherein, for at least one of the calibration images, the tilt and roll are known prior to calibration and are excluded from the updating.

9. The method of claim 1, wherein, for at least one of the calibration images, the vertices of the projection are on the bounding box.

10. The method of claim 1, wherein, for at least one of the calibration images, the horizon line has a negative slope.

11. The method of claim 1, wherein, for at least one of the calibration images, the horizon line has a positive slope.

12. The method of claim 10, wherein, for at least one of the calibration images for which the horizon line has a negative slope, a horizontal position of the vanishing point is less than a horizontal position of a leftmost one of the foot vertices.

13. The method of claim 10, wherein, for at least one of the calibration images for which the horizon line has a negative slope, a horizontal position of the vanishing point is greater than a horizontal position of a leftmost one of the head vertices.

14. The method of claim 10, wherein, for at least one of the calibration images for which the horizon line has a negative slope, a horizontal position of the vanishing point equals or exceeds a horizontal position of a leftmost one of the head vertices, and is less than or equals a horizontal position of a rightmost one of the head vertices.

15. The method of claim 11, wherein, for at least one of the calibration images for which the horizon line has a positive slope, a horizontal position of the vanishing point is greater than a horizontal position of a rightmost one of the foot vertices.

16. The method of claim 11, wherein, for at least one of the calibration images for which the horizon line has a positive slope, a horizontal position of the vanishing point is less than a horizontal position of a rightmost one of the head vertices.

17. The method of claim 11, wherein, for at least one of the calibration images for which the horizon line has a positive slope, a horizontal position of the vanishing point equals or exceeds a horizontal position of a leftmost one of the head vertices, and is less than or equals a horizontal position of a rightmost one of the head vertices.

18. The method of claim 1, wherein, for at least one of the calibration images, the tilt is deemed to be 180 degrees, and wherein the result of the updating the at least one of the calibration images for which the tilt is deemed to be 180 degrees is used as a starting point for the updating of at least one other of the calibration images for which the tilt is non-horizontal.

19. The method of claim 1, wherein the mapping comprises a feet-to-head homology.

20. The method of claim 19, wherein the feet-to-head homology is determined as $$H_{fh} = I - \frac{h_H}{h_C} \frac{\tilde{v} \tilde{l}^T}{\tilde{v}^T \tilde{l}},$$

wherein I is a 3×3 identity matrix, $h_H$ is the presumed height of the person, $h_C$ is the height of the camera, $\tilde{v}^T$ l̃ is a vector dot product of a transpose of the vanishing point in homogenous coordinates and the horizon line in homogenous coordinates, and $\tilde{v}\tilde{l}^T$ is a vector outer product of the vanishing point in homogenous coordinates and a transpose of the horizon line in homogenous coordinates.

21. The method of claim 1, wherein the projection is of a parallelepiped that bounds the person.

22. The method of claim 21 wherein a height of the parallelepiped is the presumed height of the person.

23. The method of claim 21, wherein, using a Cartesian coordinate system, the camera is located at X=Y=0 and the parallelepiped has faces parallel to coordinate planes (X,Z), (X,Y), and (Y,Z).

24. The method of claim 21, wherein edges of the projection of the parallelepiped corresponding to horizontal edges of the parallelepiped are parallel to the horizon line.

25. The method of claim 21 wherein the parallelepiped is square in a ground plane on which the person stands.

26. The method of claim 21, wherein determining the projection is performed using, in addition to the vanishing point and the horizon line, an image-to-ground homography.

27. The method of claim 26, wherein the image-to-ground homography is determined as $$H_{iq} = \begin{pmatrix} f\cos\rho & -f\sin\rho\cos\theta & -f\frac{h_C}{h_H}\sin\rho\sin\theta \\ f\sin\rho & f\cos\rho\cos\theta & f\frac{h_C}{h_H}\cos\rho\sin\theta \\ 0 & \sin\theta & -\frac{h_C}{h_H}\cos\rho \end{pmatrix}$$

wherein $h_H$ is the presumed height of the person, $h_C$ is the height of the camera, f is the focal length of the camera, θ is the tilt of the camera, and ρ is the roll of the camera.

28. The method of claim 1, wherein an initial guess for a solution to the objective function is a solution to a linear regression model of estimated height of the person based on coordinates in the calibration image.

29. A camera comprising:
a camera housing comprising an aperture;
an image sensor within the housing;
a lens positioned within the housing such that light entering the aperture is focused on the image sensor;
a processor communicatively coupled to the image sensor; and
a memory device having stored thereon computer program code that is executable by the processor and that, when executed by the processor, causes the processor to perform a method comprising:
   obtaining one or more calibration images captured using a camera, the one or more calibration images comprising one or more bounding boxes of which each bounds a person;
   for each of the bounding boxes, determining:
      from tilt, roll, and focal length of the camera, a vanishing point and a horizon line of the calibration image;
      using the vanishing point and the horizon line, a projection of the person bounded by the bounding box;
      using the vanishing point, the horizon line, a height of the camera, and a presumed height of the person, a mapping that maps foot vertices of the projection to head vertices of the projection; and
      using at least one of the foot vertices and the mapping, at least one estimate of the head vertices and at least one distance between at least one of the head vertices and the at least one estimate; and
   calibrating the camera by iteratively updating, using an objective function and the at least one of the distances for each of the one or more bounding boxes, at least one of the tilt, roll, focal length, and height of the camera.

30. A memory device having stored thereon computer program code that is executable by a processor and that, when executed by the processor, causes the processor to perform a method comprising:
   obtaining one or more calibration images captured using a camera, the one or more calibration images comprising one or more bounding boxes of which each bounds a person;
   for each of the bounding boxes, determining:
      from tilt, roll, and focal length of the camera, a vanishing point and a horizon line of the calibration image;
      using the vanishing point and the horizon line, a projection of the person bounded by the bounding box;
      using the vanishing point, the horizon line, a height of the camera, and a presumed height of the person, a mapping that maps foot vertices of the projection to head vertices of the projection; and
      using at least one of the foot vertices and the mapping, at least one estimate of the head vertices and at least one distance between at least one of the head vertices and the at least one estimate; and
   calibrating the camera by iteratively updating, using an objective function and the at least one of the distances for each of the one or more bounding boxes, at least one of the tilt, roll, focal length, and height of the camera.

31. A security system comprising:
a camera; and
a server communicatively coupled to the camera, wherein the camera and the server are collectively configured to perform a method comprising:
   obtaining one or more calibration images captured using a camera, the one or more calibration images comprising one or more bounding boxes of which each bounds a person;
   for each of the bounding boxes, determining:
      from tilt, roll, and focal length of the camera, a vanishing point and a horizon line of the calibration image;
      using the vanishing point and the horizon line, a projection of the person bounded by the bounding box;
      using the vanishing point, the horizon line, a height of the camera, and a presumed height of the person, a mapping that maps foot vertices of the projection to head vertices of the projection; and
      using at least one of the foot vertices and the mapping, at least one estimate of the head vertices and at least one distance between at least one of the head vertices and the at least one estimate; and
   calibrating the camera by iteratively updating, using an objective function and the at least one of the distances for each of the one or more bounding boxes, at least one of the tilt, roll, focal length, and height of the camera.

* * * * *